United States Patent [19]

Kawai et al.

[11] Patent Number: 5,584,010
[45] Date of Patent: Dec. 10, 1996

[54] DIRECT MEMORY ACCESS CONTROL DEVICE AND METHOD IN A MULTIPROCESSOR SYSTEM ACCESSING LOCAL AND SHARED MEMORY

[75] Inventors: Hiroyuki Kawai; Hideyuki Terane, both of Hyogo-ken, Japan

[73] Assignee: Mitsubishi Denki Kabushiki Kaisha, Tokyo, Japan

[21] Appl. No.: 358,670

[22] Filed: Dec. 19, 1994

Related U.S. Application Data

[63] Continuation of Ser. No. 171,259, Dec. 21, 1993, abandoned, which is a continuation of Ser. No. 983,094, Nov. 24, 1992, abandoned, which is a continuation of Ser. No. 406,210, Sep. 12, 1989, abandoned.

[30] Foreign Application Priority Data

Nov. 25, 1988 [JP] Japan .................................. 63-299126

[51] Int. Cl.[6] .............................. G06F 13/40; G06F 13/36; G06F 12/08
[52] U.S. Cl. ......................... 395/444; 395/308; 395/311; 395/287; 395/474; 395/448
[58] Field of Search ............................ 364/200 MS File, 364/900 MS File, DIG. 1; 395/425 MS, 325, 444, 448, 308, 311, 287, 474, 309, 478, 800, 306, 410

[56] References Cited

U.S. PATENT DOCUMENTS

| | | | |
|---|---|---|---|
| 4,481,578 | 11/1984 | Hughes et al. ...................... | 395/200.07 |
| 4,484,273 | 11/1984 | Stiffler et al. ........................... | 395/290 |
| 4,509,140 | 4/1985 | Cheung .................................... | 395/478 |
| 4,570,220 | 2/1986 | Tetrick et al. .......................... | 395/306 |
| 4,608,631 | 8/1986 | Stiffler et al. ........................... | 395/293 |
| 4,789,963 | 12/1988 | Takahashi et al. ....................... | 345/187 |
| 4,829,420 | 5/1989 | Stähle ..................................... | 395/410 |
| 4,860,249 | 9/1989 | Nicely et al. ............................ | 395/800 |
| 4,862,350 | 8/1989 | Orr et al. ................................ | 395/250 |
| 4,866,665 | 9/1989 | Haswell-Smith ................... | 395/183.11 |
| 4,920,480 | 4/1990 | Murakami et al. ..................... | 395/800 |
| 4,928,224 | 5/1990 | Zulian ..................................... | 395/309 |
| 5,019,962 | 5/1991 | Funabashi et al. ................. | 395/200.08 |

OTHER PUBLICATIONS

C. Erskine et al "Architecture and Applications of a Second–Generation Digital Signal Processor," 1985, IEEE, pp. 228–231.

K. Kaneko et al, "A 50ns DSP with Parallel Processing Architecture," 1987 IEEE International Solid–State Circuits Conference, Digest of Technical Papers (Feb. 26, 1987), pp. 158–159.

*Primary Examiner*—Tod R. Swann
*Assistant Examiner*—James Peikari
*Attorney, Agent, or Firm*—Lowe, Price, LeBlanc & Becker

[57] ABSTRACT

A direct memory access control device is used in a multiprocessor system having a plurality of digital data processors and an external common memory connected in common to those digital data processors through a first bus. In the case of transferring data in a direct memory access mode between processors, the transfer of data between the processors is effected by the control device through a second data bus provided in common to the plurality of digital data processors separately from the first bus. Thus, data can be transferred directly in a direct memory access mode between the processors without using the external memory and high-speed transfer can be realized. In addition, the control device comprises registers for storing the status bits of each digital data processor, such as direct memory access request and acceptance signals, corresponding to each digital data processor. Request and acceptance of direct memory access and transfer of data are effected by monitoring the contents of those registers.

47 Claims, 16 Drawing Sheets

509: INTERNAL DATA BUS
510: INTERNAL ADDRESS BUS
511: MEMORY CONTROL LINE

EXTERNAL MODE

LOCAL MODE

FIG.8

CONTROL REGISTER 250

| BIT → | 6 | 5 | 4 | 3 | 2 | 1 | 0 |
|---|---|---|---|---|---|---|---|
| TRANSFER MODE | DSP-3 | DSP-2 | DSP-1 | DSP-3 | DSP-2 | DSP-1 |
| 1;1:1 | LOCAL BUS REQUEST ON | LOCAL BUS REQUEST ON | LOCAL BUS REQUEST ON | 1;RECEIVER INDICATE | 1;RECEIVER INDICATE | 1;RECEIVER INDICATE |
| 0;BROADCAST | 0;OFF | 0;OFF | 0;OFF | 0;CANCEL | 0;CANCEL | 0;CANCEL |

SOURCE INSTRUCTION | DESTINATION INSTRUCTION

REQUEST

FIG.9

STATUS REGISTER 251

| BIT → | 5 | 4 | 3 | 2 | 1 | 0 |
|---|---|---|---|---|---|---|
| DSP-3 | DSP-2 | DSP-1 | DSP-3 | DSP-2 | DSP-1 |
| 1; BUSY | 1; BUSY | 1; BUSY | 1;ACKNOWLEDGE ON | 1;ACKNOWLEDGE ON | 1;ACKNOWLEDGE ON |
| 0; NON-BUSY | 0; NON-BUSY | 0; NON-BUSY | 0;OFF | 0;OFF | 0;OFF |

ACKNOWLEDGE

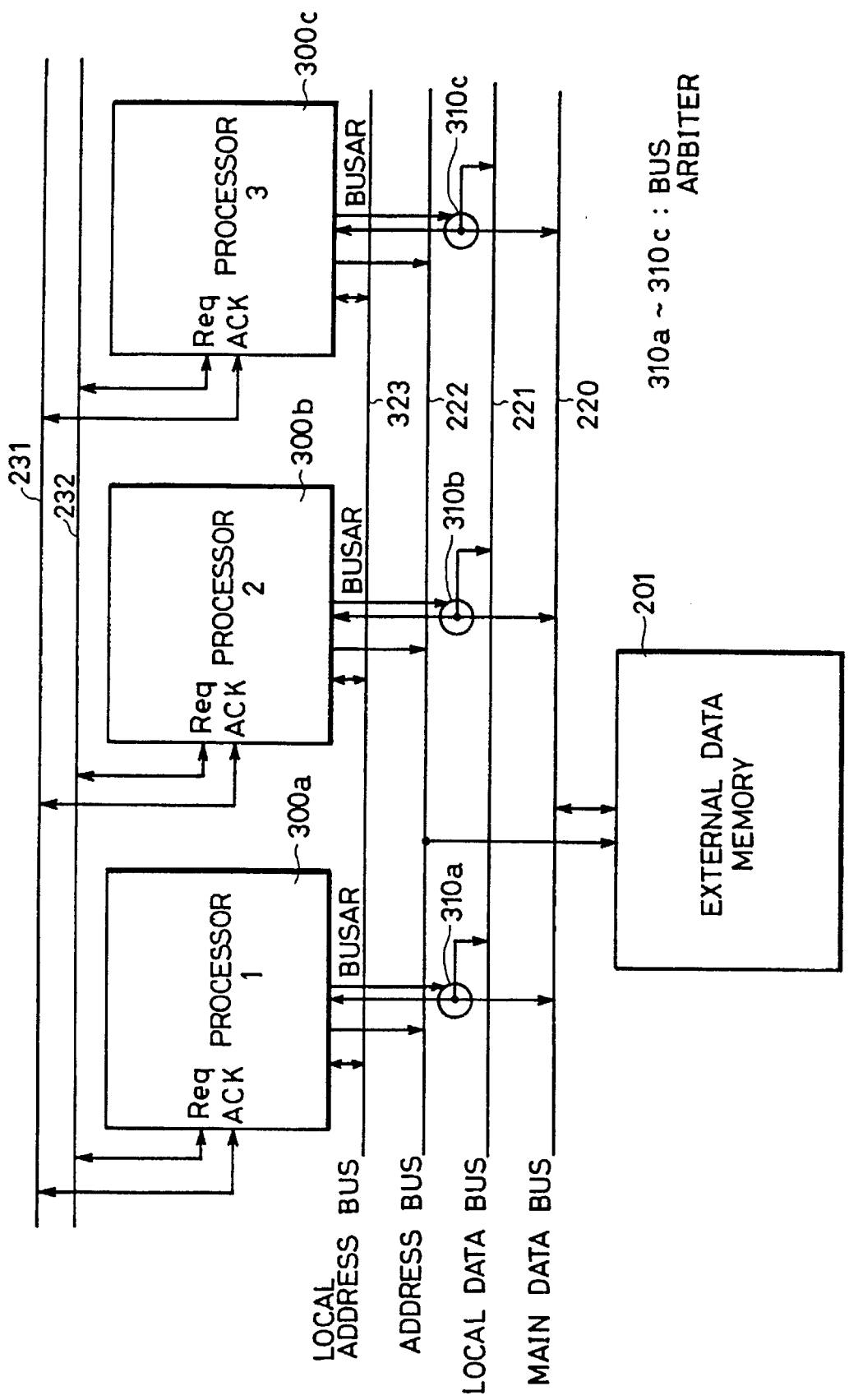

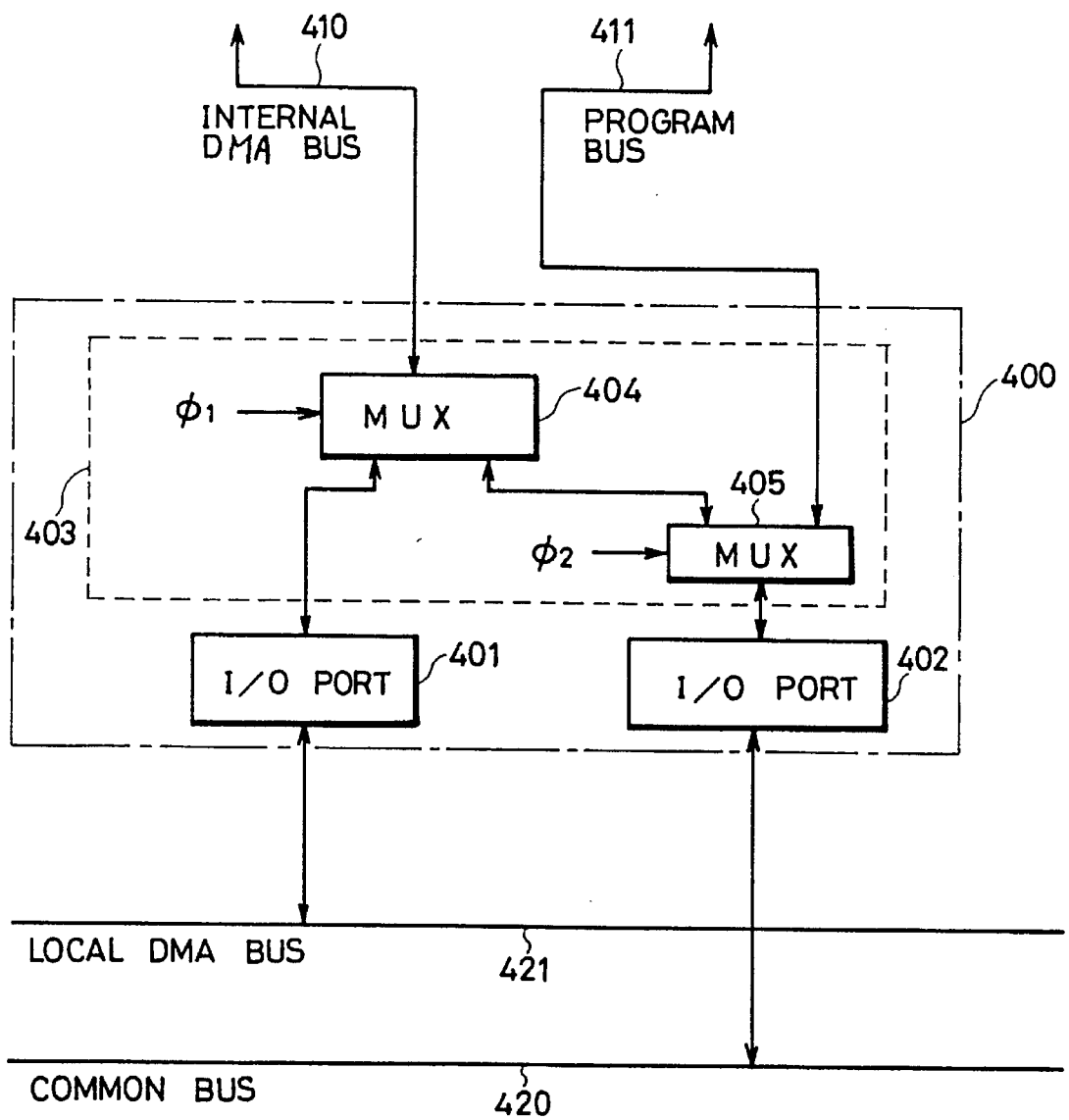

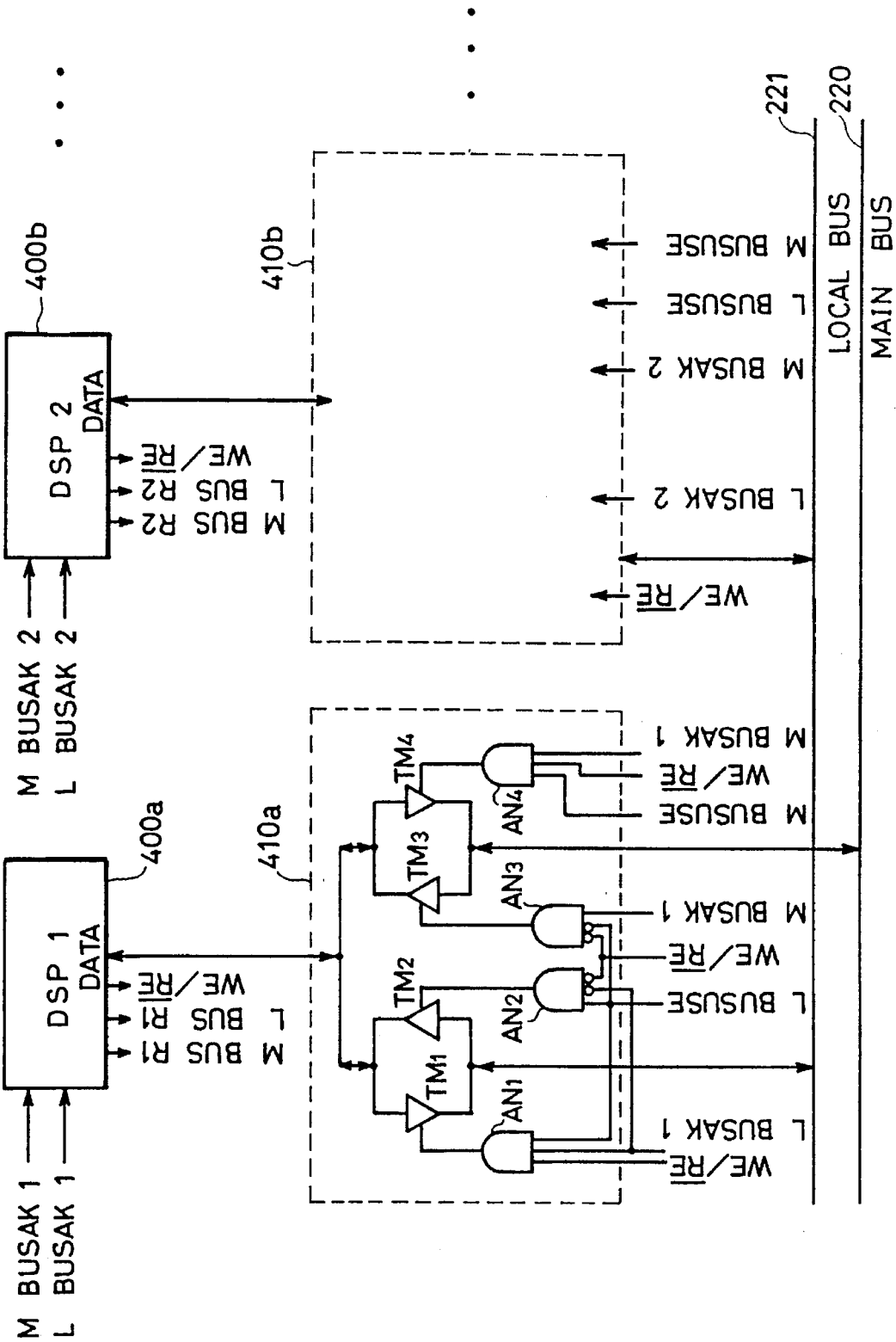

DIRECT MEMORY ACCESS CONTROL DEVICE AND METHOD IN A MULTIPROCESSOR SYSTEM ACCESSING LOCAL AND SHARED MEMORY

This application is a continuation of application Ser. No. 08/171,259 filed Dec. 21, 1993, now abandoned, which is a continuation of application Ser. No. 07/983,094 filed Nov. 24, 1992, now abandoned, which is a continuation application of Application Ser. No. 07/406,210 filed Sep. 12, 1989, now abandoned.

BACKGROUND OF THE INVENTION

1. Field of the Invention

The present invention relates to a direct memory access control device in a multiprocessor system and a method therefor, and particularly to a structure of a direct memory access control device which enables direct transfer of data between digital data processors in a multiprocessor system, thereby improving a throughput of the multiprocessor system.

2. Description of the Background Art

In a field of digital data processing such as scientific calculation, image processing or the like, a multiprocessor system is employed for fast processing of a large volume of data by parallel operation of a plurality of processors, as disclosed in the article of "A 50 ns DSP with Parallel Processing Architecture", by K. Kaneko et al., 1987 IEEE ISSCC Digest of Technical Papers, February 1987, pp. 158 to 159. In general, a signal processor employed in such a multiprocessor system can operate both in direct memory access mode and in register transfer mode for data transfer from/to an externally provided device. In direct memory accessing mode, data transfer between a processor and an external device (a memory or processor) is effected directly under control of a direct memory access controller which is an on-chip or off-chip device. In register transfer mode, data are transferred between a processor and an external device through on-chip register or registers under control of a central processing unit CPU included in the processor. In the register transfer mode, writing data into the register, reading out data from the register to transfer the read-out data to the external device or to a predetermined internal memory and addressing for the writing and reading of data are controlled by CPU, and therefore this mode (register transfer mode) requires more time for data transfer than in DMA (direct memory access) mode. For example, in the register transfer mode, the following instructions should be executed for data transfer:

LD A, (300H)

OUT (20H), A.

These two instructions require a total of 7 machine cycles. Here, the first instruction means loading of the content in the address 300H into the input/output register A, and the second instruction means outputting of the content in the register A to a device having the address (20H).

In a multiprocessor system, respective processors have different operations assigned thereto, required data are transferred between processors. For example, calculation of Y=(A+B)×C is now considered. A first processor performs calculation of Z=(A+B), and a second processor performs calculation of Y=Z×C, and an external memory provided common to the first and second processors stores data of A, B and C. In such configuration, data should be transferred in DMA mode for fast calculation. Further, it is desired that a multiprocessor system should be implemented with a plurality of digital data processors of low cost and high operability from the viewpoint of system performance and system size. In the following such multiprocessor system will be described.

The multiprocessor system includes a plurality of digital data processors and an external common memory connected through a common data bus to those digital data processors. In order to access the external common memory, the respective digital data processors transfer data directly between an internal memory contained in each digital data processor and the external common memory according to a method called direct memory access. In the following, the direct memory access system in a conventional multiprocessor system will be described with reference to the drawings.

FIG. 1 shows a schematic construction of a conventional multiprocessor system. Referring to FIG. 1, the multiprocessor system shown as an example comprises three digital data processors 500a, 500b and 500c, and an external memory 503 provided in common for those digital data processors. The digital data processors 500a to 500c comprise internal data memories 501a to 501c, respectively, for storing data necessary for various operation processing, and direct memory access control devices 502a to 502c, respectively, for controlling transfer of data between the respective internal data memories 501a to 501c and the external memory 503. The respective direct memory access control devices 502a to 502c can access the internal memory 503 through an address bus 504 and a data bus 505. Address data for designating an address to be accessed in the external memory 503 is transferred onto the address bus 504. Information data transferred between the external memory and the internal data memories 501a to 501c is transmitted onto the data bus 505.

FIG. 2 is a diagram schematically showing a construction of a conventional digital data processor. Referring to FIG. 2, the conventional digital data processor comprises: an internal data memory 501, a direct memory access control device (DMAC) 502, a sequencer 506 for monitoring and controlling operation in the digital data processor 500, a processing unit 507 for performing various operation processing under the control of the sequencer 506, and an input/output interface circuit 508 for providing interface between the internal data memory 501 and the external memory 3. An internal data bus 509 for transmitting internal data and an internal address bus 510 for transmitting an internal memory address and an external memory address are provided between the input/output interface circuit 508 and the internal data memory 501. The processing unit 507 accesses the internal data memory 501 through the internal data bus 509 and the internal address bus 510.

The sequencer 506 monitors a signal state on the control bus 513 and observes whether direct memory access is enabled or not, and at the same time it controls the direct memory access control device 502 so that the digital data processor 500 carries out direct memory access operation.

The direct memory access control device 502 controls operation of the internal data memory 501 through the DMA memory control line 511 and transmits addresses for the internal memory 501 and the external memory 503 onto the internal address bus 510. Referring now to FIGS. 1 and 2, direct memory access operation in the conventional multiprocessor system will be described.

First, direct memory access operation between the internal data memory 501 and the external memory 503 (an external mode) will be described with reference to FIG. 3. Now, let us assume a case in which accessing is effected from the digital processor 500a to the external memory 503. If it becomes necessary to access the external memory 503 during execution of a given program, the sequencer 506 monitors a bus request BUSREQ and a bus acceptance signal BUSACK on the control bus 513 and determines whether access to the external memory 503 is permitted or not (S1). If there is no bus request signal BUSREQ asserted on the control bus 513, the sequencer 506 transmits a bus request signal BUSREQ requesting use of the bus and starts a direct access mode (S2). Subsequently, the sequencer 506 applies a direct memory access request signal DMARQ to the direct memory access control device 502 (S3) and when it receives a direct memory access acceptance signal DMACK from the direct memory access control device 502, it separates the processing unit 507 from the internal data memory 501 and submits, to the direct memory access control device, the transfer of data between the internal data memory 501 and the external memory 503. The direct memory access control device 502 transmits the direct memory access acceptance signal DMACK and then controls operation (write/read) of the internal data memory 501 through the DMA memory control line 511 and transmits an internal address indicating a data storing position for the internal data memory 502 and an address indicating an access position for the external memory 503 onto the internal address bus 510. The address for the external memory 503 transmitted onto the internal bus 510 is transmitted to the address bus 504 through the input/output interface circuit 508 and supplied to the external memory 503. Subsequently, transfer of data is effected between the designated address of the external memory 503 and the designated address of the internal data memory 501 through the data buses 505 and 509 and the input/output interface circuit 508 (S5). After the necessary number of transfers of data have been effected (S6), the direct memory access control device 502 is disabled under the control of the sequencer 506 and processing operation according to a program stored in advance is carried out by using data stored in the internal data memory 501 under the control of the sequencer 506.

Next, data transfer operation (a local mode) from the digital data processor 500a to the digital data processor 500b shown in FIG. 1 will be described, with reference to FIG. 4.

First, the sequencer 506 in the digital data processor 500a monitors a signal state on the control bus 513 and determines whether direct memory access is permitted or not (S10). If it is determined that direct memory access is permitted, a bus request signal BUSREQ is transmitted to the control bus 513 and the direct memory access control device 502 is activated by the above described direct memory access operation, whereby the internal data memory 501 is accessed under the control of the direct memory access control device 502a. More specifically, the direct memory access control device 502a outputs a read-out address of the internal data memory 501a onto the internal address bus 510 and transmits the data read out from the internal data memory 501a onto the internal data bus 509 according to that address. Meanwhile, the direct memory access control device generates and outputs a write-in address of the external memory 503 onto the internal address bus 510. By this sequential operation, necessary data of the internal data memory 501a is transferred to the external memory 503 through the input/output interface circuit 508 (S11). When the data transfer operation from the digital data processor 500a to the external memory 503 is terminated, the direct memory access operation of the digital data processor 500a is terminated and then direct memory access memory operation in the digital data processor 500b is started (S12). More specifically, in the digital data processor 500b, the direct memory access control device 502 in the external digital data processor 500b is activated under the control of the sequencer 506 and, in the same manner as in the above described operation of the digital data processor 500a (S13), the data written previously in the external memory 503 is transferred to the internal data memory in the digital data processor (S14).

During the data transfer operation between the digital data processor 500a and the digital data processor 500b, the bus request signal BUSREQ is transmitted on the control bus 513 and even if it becomes necessary for the third digital data processor 500c to access the external memory 503, the digital processor 500c is brought into a waiting state until the data transfer between the digital data processors 500a and 500b is terminated since the address bus 504 and the data bus 505 are being used. After the data transfer between the digital data processors 500a and 500b is terminated and the address bus 504 and the data bus 505 are released, the digital data processor 500c starts transfer of data to the external memory 503.

If data in the internal memory 501a in the digital data processor 500a is required by other digital data processors 500b and 500c, the data is first transferred from the internal data memory 501a to the external memory 503 and then is transferred from the external memory 503 to the internal data memory 501b. After the transfer of the data into the internal data memory 501b is terminated, the data is transferred from the external memory 503 to the internal memory 501c.

As described above, in the digital data processor containing the conventional direct memory access control device, direct transfer of data is effected only between the external memory 503 and the internal data memory 501. Accordingly, if a multiprocessor system is structured by using such digital data processors, transfer of data between the digital data processors needs to be effected through a low-speed external memory. Thus, the advantage of high speed in the direct memory access cannot be sufficiently utilized and data cannot be transferred at high speed between processors.

In addition, since the data bus is used in common for the plurality of digital data processors, the digital data processors not actually related with communication (transfer of data) between processors by direct memory access in the system are not permitted to access the external memory 503 during the communication between the processors. Consequently, necessary processing cannot be effected at high speed and the throughput of the whole system is lowered.

In addition, if an arbitrary digital data processor is used as a transmission source and the other digital data processors in the system are used as reception destinations to transfer data, it is necessary to use a sequence of transferring data from the transmission source to the external data memory 503 and accessing the external data memory successively by the designated digital data processors as the reception destinations. Thus, much time is required for the transfer of data to prolong the data processing time, and the thruput of the system is lowered.

SUMMARY OF THE INVENTION

An object of the present invention is to provide a direct memory access control device capable of transferring data at high speed between a plurality of digital data processors in a multiprocessor system.

Another object of the present invention is to provide a direct memory access control device capable of accessing an external memory in parallel with transfer of data effected in a direct memory access mode between a plurality of processors in a multiprocessor system.

A further object of the present invention is to provide a digital data processor having a direct memory access mode operation which makes it possible to improve a thruput of a multiprocessor system.

A still further object of the present invention is to provide an improved method of direct memory accessing in a multiprocessing system.

A direct memory access control device according to the present invention is provided corresponding to each digital data processor in a multiprocessor system and it includes circuitry for transmitting a signal requesting a transmission of data in a direct memory access mode, circuitry for receiving the data transmission request signal in a direct memory access mode, and circuitry for transmitting a signal accepting reception of data in the direct memory access mode. The system further includes circuitry for receiving the signal accepting the reception of data in the direct memory access mode, circuitry responsive to reception of the direct memory access mode reception accepting signal, for accessing an internal memory contained in the related digital data processor, and transmitting the data of the internal memory onto a second bus provided separately from a common bus connected to the external memory, and circuitry for accessing the internal memory contained in the associated digital data processor after the transmission of the direct memory access mode reception acceptance signal, and writing the data transmitted on the second bus.

The data transmission request signal includes transmission side specifying information and reception side specifying information, while the data reception acceptance signal includes reception side specifying information.

The digital data processor includes, in addition to the above described control device, means for generating a signal designating transfer of data in a direct mode between a plurality of digital data processors; means for generating a signal designating transfer of data in a direct memory access mode between an internal memory contained in the associated digital data processor and an external memory provided in common for the plurality of digital data processors; and arbiter means responsive to control signals from the two signal generating means, for connecting the related internal memory to either the common bus connected with the external memory or a bus dedicated to direct memory access transmission provided separately from the common bus.

Preferably, the digital data processor includes an input/output port for transfer of data between the processors, an input/output port for transfer of data between the internal memory and the external memory.

The direct memory access control device according to the present invention designates a data transmission destination and transfers data between the internal memories contained in the respective digital data processors through the bus dedicated to transmission of data between the digital data processors in the direct memory access mode, in response to the acceptance signal from the designated digital data processor. Accordingly, the transfer of data in the direct memory access mode can be effected directly between the digital data processors, not through the low-speed external memory, and thus the transfer of data can be effected at high speed.

In addition, since transfer of data between the digital data processors is effected through the special bus, the digital data processors not related with the transfer of data are not in standby state and can access the external memory through the common bus.

Further, the arbiter means makes it possible for a processor to access the external memory in parallel with the direct data transfer operation between the digital data processors.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an illustration showing a structure of a control register for supporting transfer of data in the direct memory access mode between the processors according to the embodiment of the invention.

FIG. 9 is an illustration showing an example of a structure of a status register for monitoring states of the respective digital data processors to support transfer of data in the direct memory access mode between the processors according to the embodiment of the invention.

FIG. 12 is a diagram showing a schematic construction of a multiprocessor system using digital data processors according to another embodiment of the invention.

FIG. 13 is a diagram showing a structure of input/output portions of a digital data processor having a processor-to-processor data transfer function according to another embodiment of the invention.

FIG. 14A shows a specific construction of the bus arbiter shown in FIGS. 5 and 12.

DESCRIPTION OF THE PREFERRED EMBODIMENTS

Figure 5:
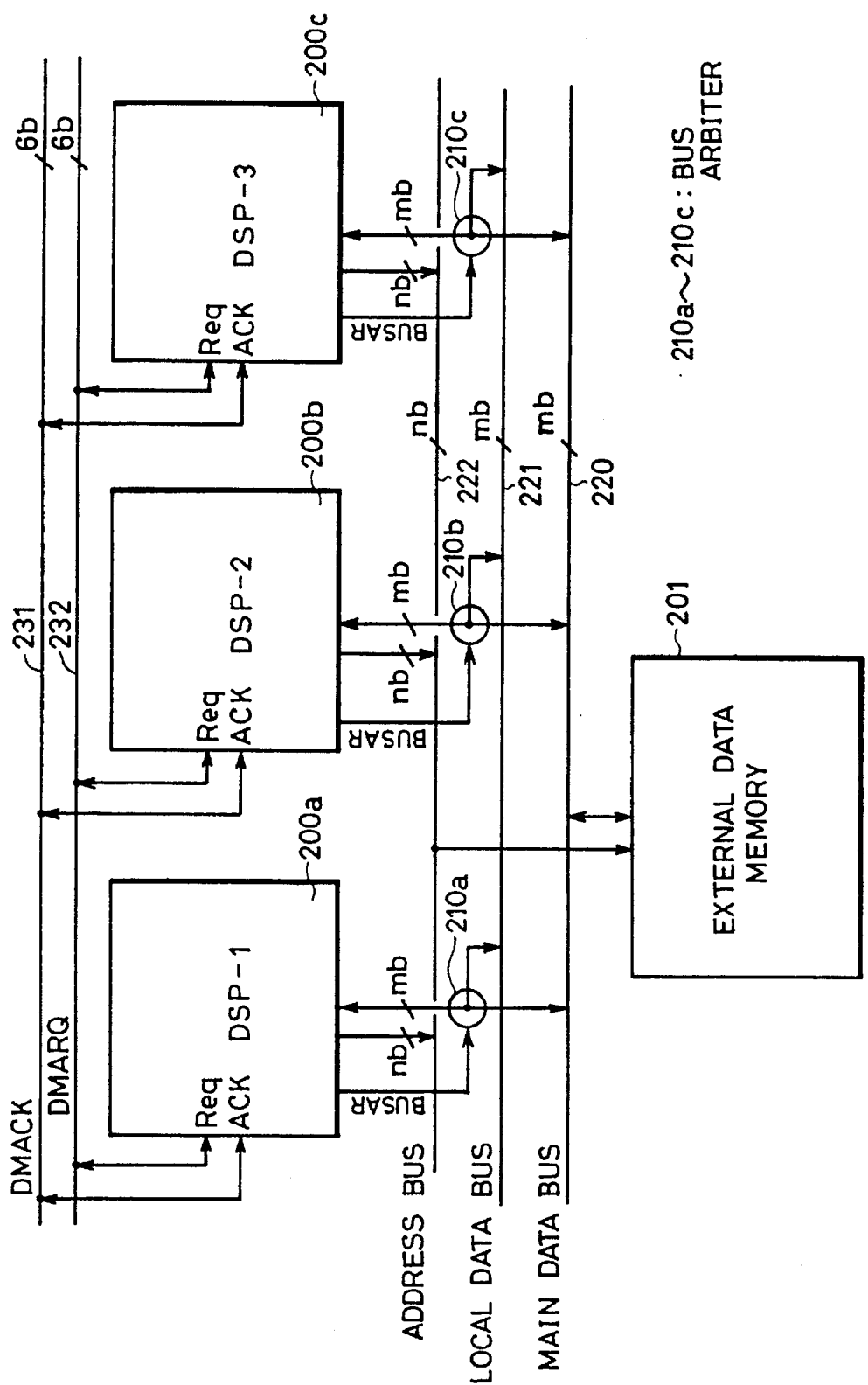
FIG. 5 is a diagram showing an example of a construction of a multiprocessor system formed by using digital data processors having a direct memory access function according to the embodiment of the invention.

FIG. 5 is a diagram showing an example of a construction of a multiprocessor system using digital data processors having a direct memory access function according to an embodiment of the invention. Referring to FIG. 5, the system comprises three digital data processors 200a, 200b and 200c, and an external data memory 201. Each of the associated digital data processors 200a to 200c provides access to the external data memory 201 through a main data bus 220 and an address bus 222. A direct memory access request signal transmission line 231 and a direct memory access acceptance signal transmission line 232 are provided to enable transfer of data in a direct memory access mode between arbitrary processors of the digital data processors 200a to 200c. At the same time, a local data bus 221 is provided to transfer data between the respective data processors in the direct memory access mode. Bus arbiters 210a to 210c for connecting a data input/output path of the related digital data processor to either the local data bus 221 or the main data bus 220 in response to a bus control signal BUSAR from the digital data processors are provided to select a data transmission path of each of the digital data processors 200a to 200c. The bus selection signal BUSAR is used to connect the data input/output path of the related digital data processor to the local data bus 221 at the time of transfer of data in the direct memory access mode between the digital data processors and to connect the data input/output path to the main data bus 220 at the time of accessing the external data memory 221.

The direct memory access request signal transmission line 231 and the data transfer acceptance signal transmission line 232 in the conventional multiprocessor system have each one bit width because it is not necessary to specify transmission source and destinations and it is only necessary to observe the state of use of the bus. However, in this embodiment, information for specifying states of the transmission and reception sides is also transmitted and accordingly each of those transmission lines 231 and 232 is structured to transmit a signal of a 6-bit width.

In the construction of FIG. 5, it is observed through the signal lines 231 and 232 whether or not data is transferred in the direct memory access mode, and operation of the bus arbiters 210a to 210c is controlled dependent on the states on the signal lines 231 and 232, whereby the corresponding digital data processor is connected to either the external local data bus 221 or the main data bus 220. More specifically, when data is transferred between the digital data processors, the transfer of data is effected through the local data bus 221, and in the direct memory access mode operation for the external data memory 201, the transfer of data is effected through the main data bus 220.

Figure 6:
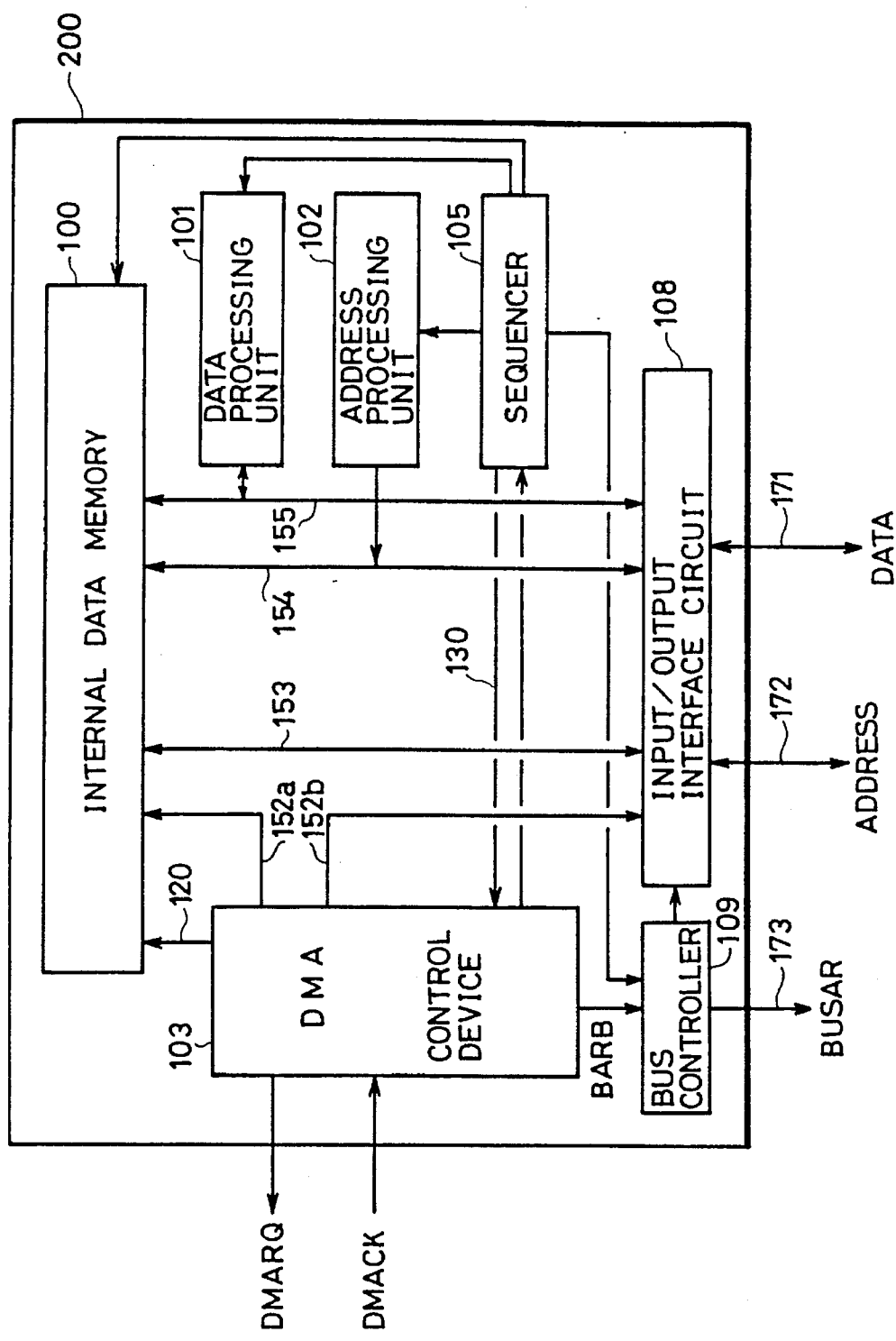
FIG. 6 is a diagram showing a schematic construction of a digital data processor which enables transfer of data between processors in a direct memory access mode, according to an embodiment of the invention.

FIG. 6 is a schematic diagram showing a construction of a digital data processor comprising a direct memory access function according to an embodiment of the invention and the same reference characters as in FIG. 5 denote the corresponding portions. Referring to FIG. 6, the digital data processor 200 comprises: an internal data memory 100 contained in the processor 200 for storing necessary data; a data processing unit 101 for transmitting and receiving data to and from the internal data memory 100 and performing predetermined processing of the data according to a given program; an address processing unit 102 for calculating an address for the internal data memory 100 or the external data memory 201 provided outside the processor 200 according to the given program; a direct memory access control device 103 for calculating addresses of the internal data memory 100 and the external data memory 201 and performing necessary control for transfer of data in the direct memory access mode; an input/output interface circuit 108 for providing interfaces between the digital data processor 200 and the external address bus 220 and between the local data bus 221 and the main data bus 220; a bus controller 109 for selecting a connection bus of the input/output interface circuit in response to an operation mode of the associated digital data processor; and a sequencer 105 for controlling operation of each function block in the digital data processor 200. An internal address bus 154 and an internal data bus 155 for transferring data and addresses according to a normal program, and an internal DMA data bus 153 and an internal DMA address bus 152 (152a and 152b) for transferring data and addresses in the direct memory access mode are provided between the input/output interface circuit 108 and the internal data memory 100. The input/output interface circuit 108 communicates information with a device external to the associated processor through the data input/output bus 171 and the address input/output bus 172.

The bus controller 109 switches a connection path of the input/output interface circuit 108 in response to control signals from the direct memory access control device 103 and the sequencer 105 and outputs the bus selection signal BUSAR through the signal line 173 to the bus arbiter 210.

The direct memory access control device 103 transmits and receives a direct memory access request signal DMARQ and a direct memory access acceptance signal DMACK containing information for specifying transmission and reception processors. The control device 103 controls operation of the internal data memory 100 through the signal line 120 in the direct memory access mode and transmits an address for the internal data memory 100 through the internal DMA address bus 152a.

Figure 7:
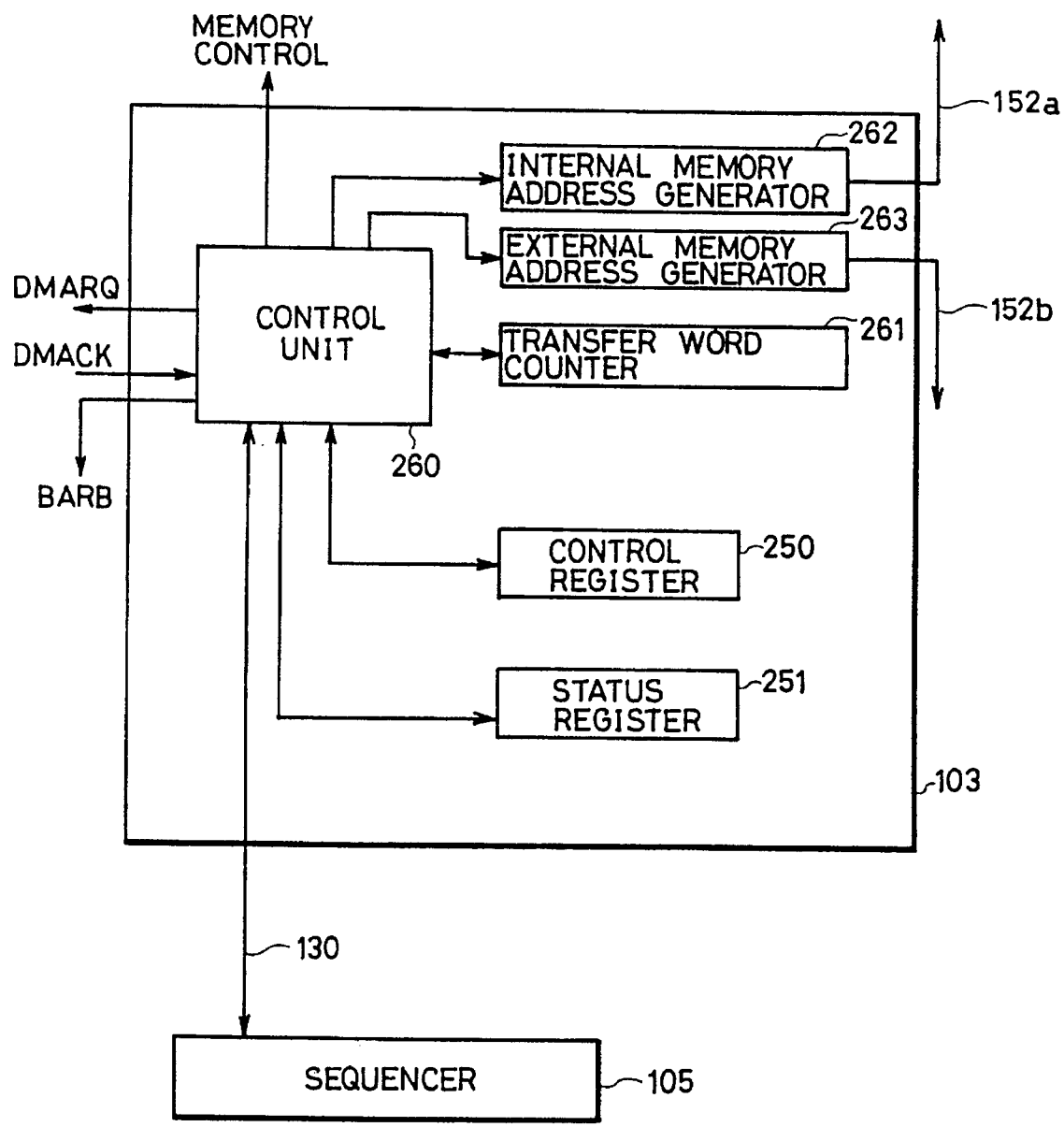
FIG. 7 is a diagram showing a schematic construction of a direct memory access control device having the direct memory access function according to the embodiment of the invention.

FIG. 7 is a diagram showing an example of a construction of the direct memory access control device according to the embodiment. Referring to FIG. 7, the direct memory access control device 103 comprises: a control register 250 for storing information specifying the source (the transmission side) and the destination (the reception side) included in the direct memory access request signal DMAREQ and information indicating a data transfer mode for one-to-one processors or a broadcast transfer mode for one-to plural processors; a status register 251 for storing a signal indicating destination specifying information and destination state information included in the data transfer acceptance signal DMACK; a transfer word counter 261 for generating transfer word number information at the time of transfer of data in the direct memory access mode; an internal memory address generator 262 for generating an address for an internal memory in the direct memory access mode; an external memory address generator 263 for generating an address for the external memory in the direct memory access mode; and a control unit 260 responsive to a control signal from the sequencer 105 through the signal line 130 for controlling operation of each function block.

FIG. 8 is a diagram showing a structure of the control register for generating the direct memory access request signal DMARQ. In FIG. 8, the control register has a 7-bit width corresponding to the three data processors 200a to 200c. The 0th to second bits are bits for designating a destination and the third to fifth bits are bits for designating a transmission source to specify a digital data processor requesting the local bus. The sixth bit is a bit indicating whether the data transfer mode in the direct memory access mode is a transfer of data in a one-to-one processor mode transfer of data in one-to-plural processors. The 0th to second bits indicates the corresponding digital data processor is designated as the destination of reception when the value becomes "1" and indicates that transfer of data is not requested when the value is "0". The third to fifth bits indicate that the digital data processor indicated by the bit position requests use of the local bus 221 when the value is "1". The sixth bit indicates the one-to-one processor transfer mode when the value is "1" and indicates transfer of data in the one-to-multiple broadcast mode when the value is "0". More specifically, the direct memory access request signal DMARQ includes information for designating the destination of reception and information for specifying the source of transmission. The data of the six bits composed of the 0th to fifth bits is transmitted as the request signal DMARQ from the direct memory access control device. The value of the sixth bit is used for control of operation in the direct memory access control device 103.

FIG. 9 is a diagram showing a configuration of the status register 251 for generating the direct memory access acceptance signal DMACK, and this register 251 has a 6-bit width. The 0th to second bits are bits for indicating whether the digital data processor indicated by the bit position accepts transfer of data in the direct memory access mode and the third to fifth bits are bits for indicating that data is being transmitted or received in the digital data processor indicated by the bit position. Accordingly, the direct memory access acceptance signal DMACK includes not only the information for specifying the reception side but also the signal indicating the states of the transmission side and the reception side. The direct memory access acceptance signal DMACK is transmitted onto the signal line 232.

Figure 10A:
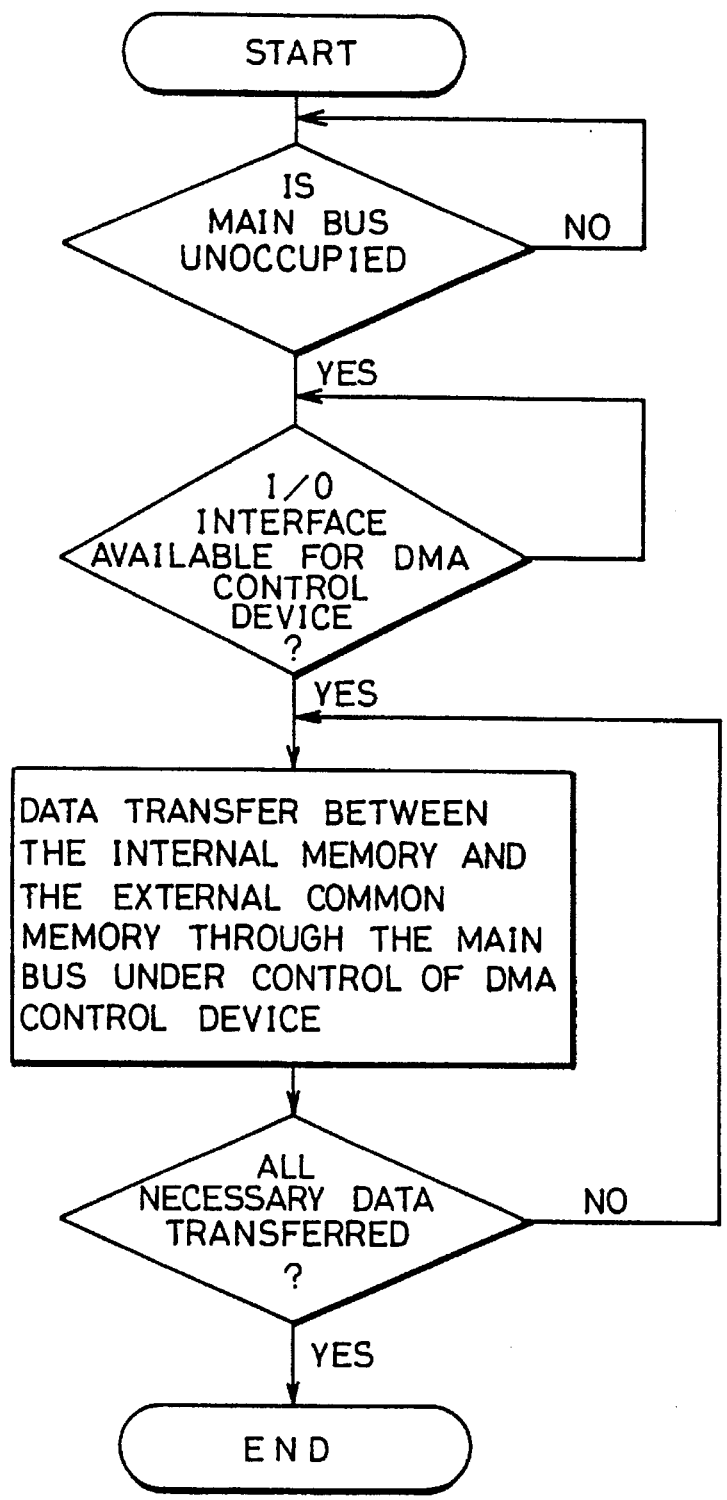
FIG. 10A, 10B and 10C are flow charts showing roughly the operations of the external, local and broadcasting modes in the invention, respectively.
Figure 10B:
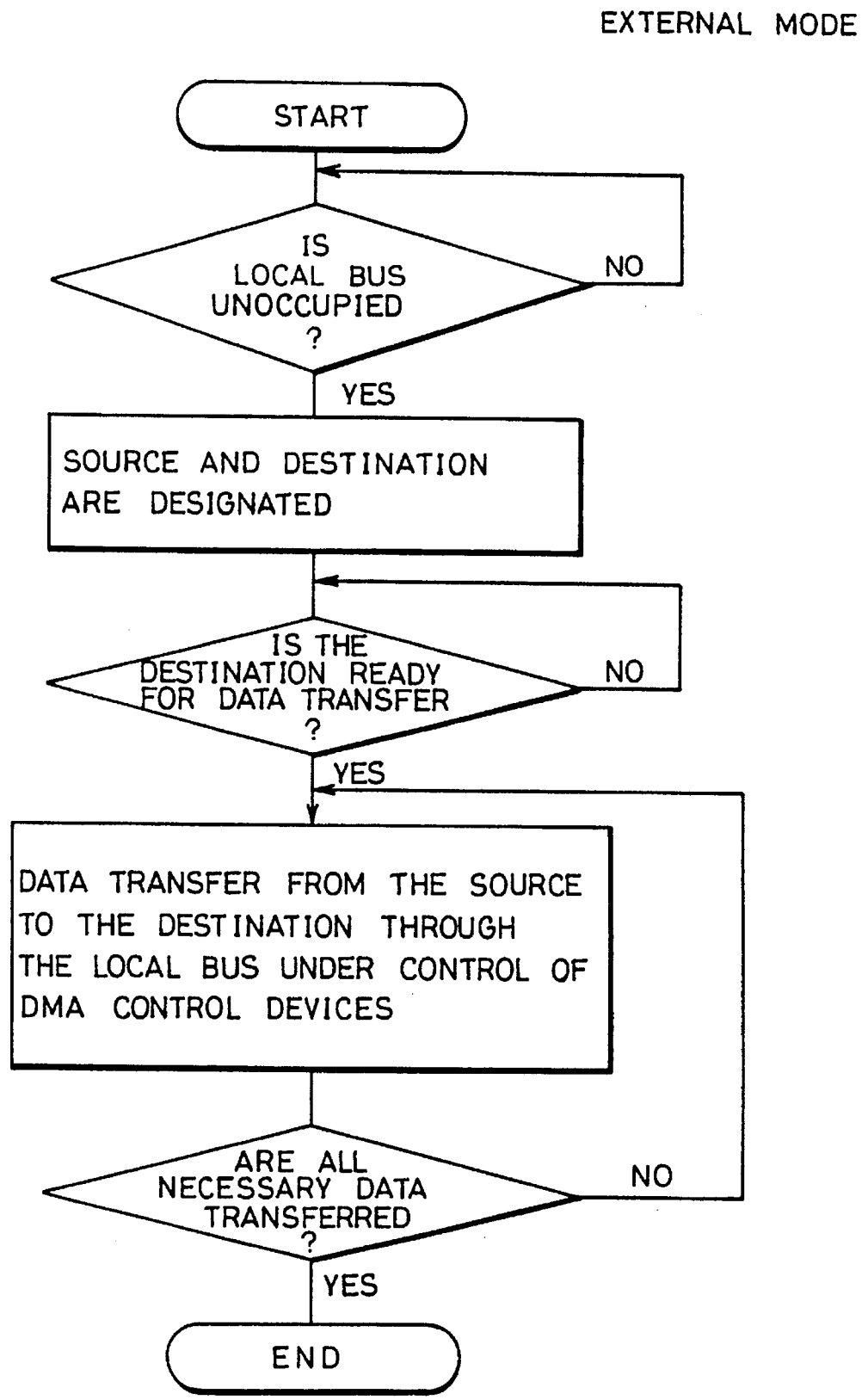
Figure 10C:
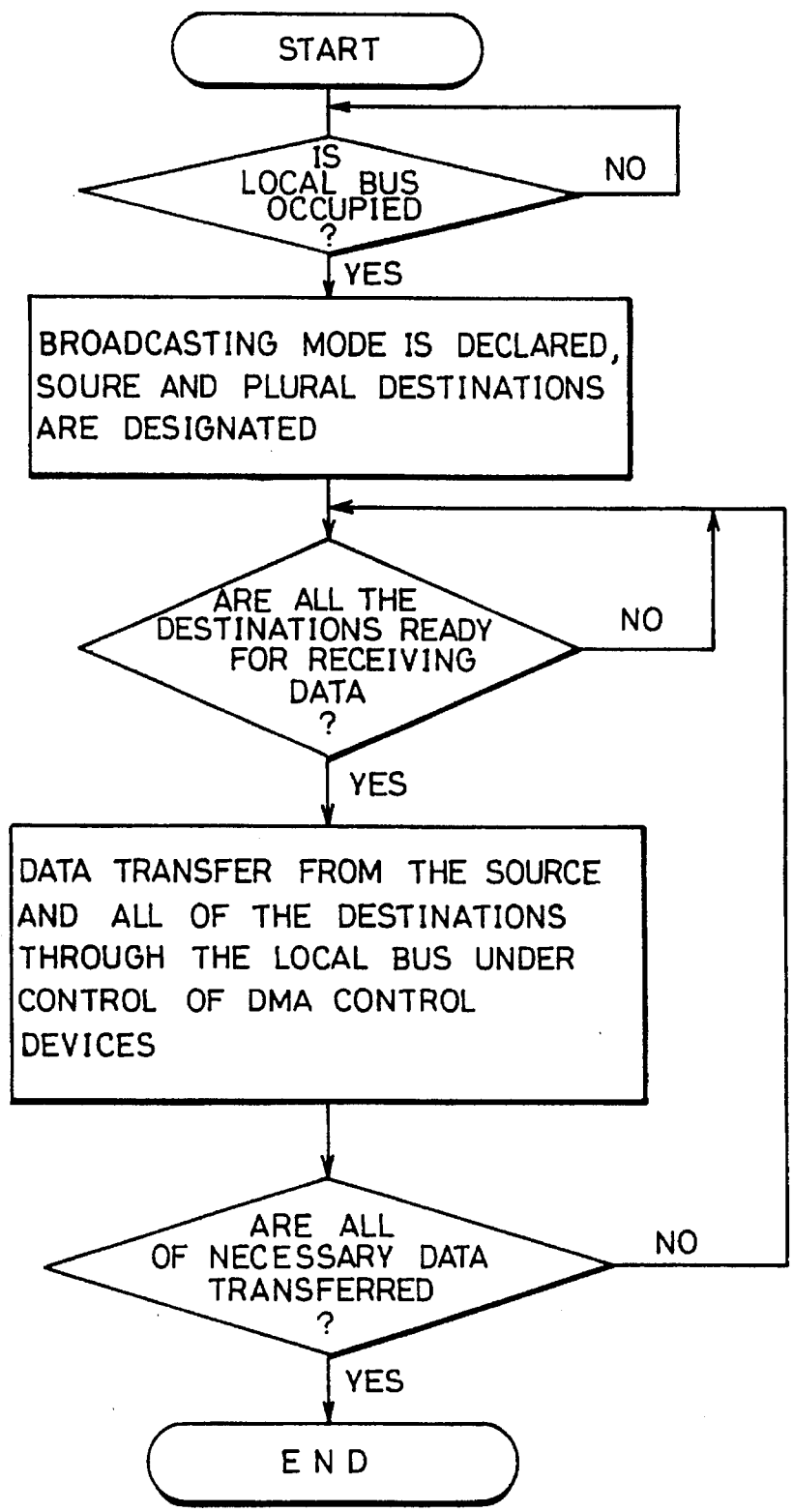

FIGS. 10A to 10C are flow charts each showing roughly the operation of the data transfer in the multiprocessor system of the present invention.

FIG. 10A shows an operation in an external mode, FIG. 10B shows an operation in a local mode and FIG. 10C shows an operation in a broadcasting mode.

In the external mode, data is transferred in direct memory access mode between an internal memory included in a digital data processor and the external common memory 201, as shown in FIG. 10A. In the external mode, data is transferred through the main data bus 220.

In the local mode, data are transferred directly through the local data bus 221 between two digital data processors, as shown in FIG. 10B.

In the broadcasting mode, data are transferred through the local data bus 221 from a digital data processor source to a plurality of digital data processor destinations, as shown in FIG. 10C.

Selection of operation mode is effected by each direct memory access control device 502 in each digital data processor. In the following, respective operation modes are described in detail.

Figure 11:
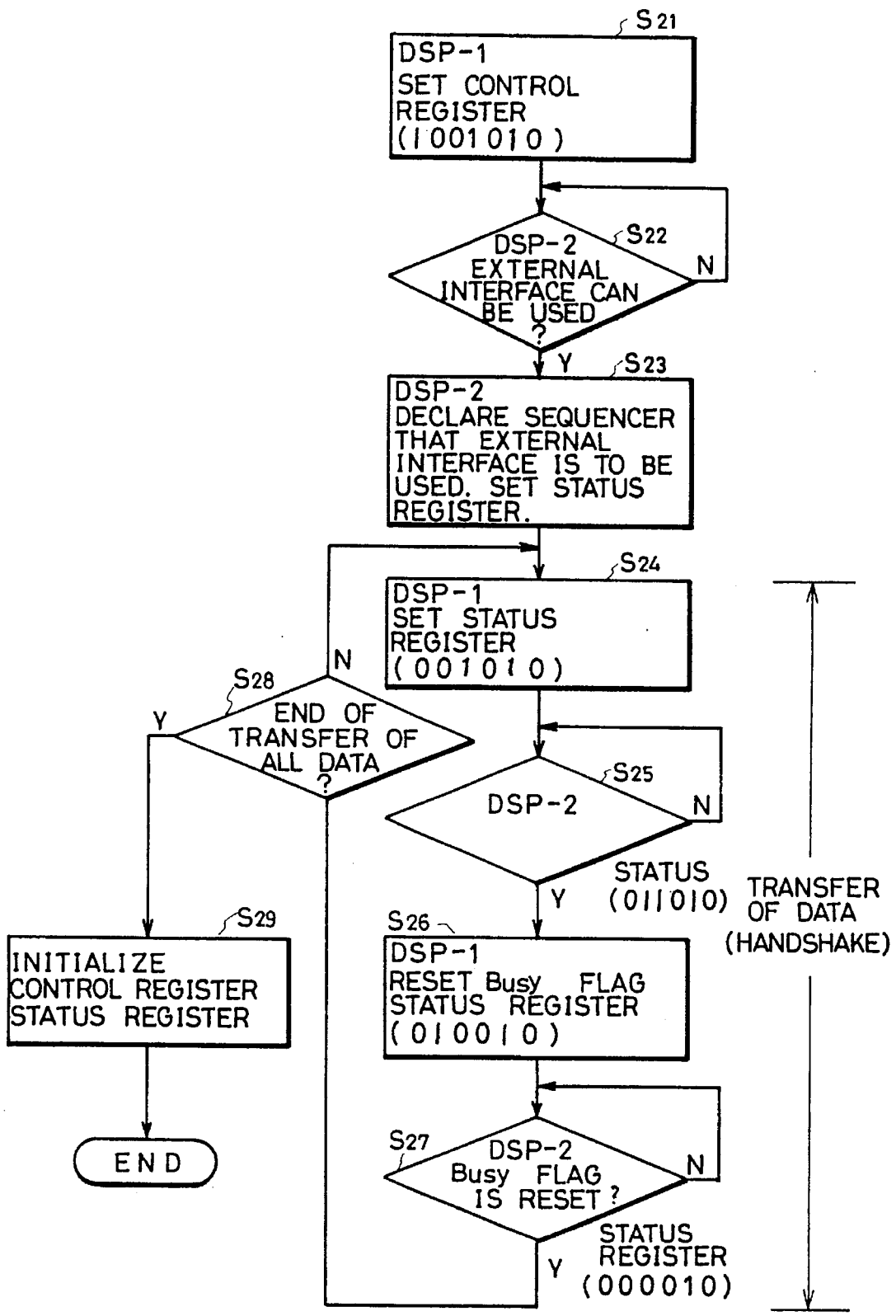
FIG. 11 is a flow chart showing operation in transfer of data in the direct memory access mode between the processors according to the embodiment of the invention.

FIG. 11 is a flow chart showing in more detail data transfer operation between the processors in the multiprocessor system including the digital data processors having the direct memory access mode according to the embodiment of the invention. In the following, referring to FIGS. 5 to 11, the data transfer operation according to the embodiment of the invention will be described.

First, description is made of operation in the case of transferring data in the direct memory access mode from the internal data memory 100 of the digital data processor 200a to the internal data memory of the digital data processor 200b (as shown in FIG. 5, the characters a, b and c being attached to the respective reference numerals to distinguish the respective digital data processors and the related components thereof). If it becomes necessary to transfer data from the digital data processor 200a to the digital data processor 200b according to a given program, the direct memory access control device 103a starts operation in response to a direct memory access instructing signal from the sequencer 105a included in the first digital data processor 200a. The direct memory access control device 103a in the digital data processor 200a transmits the less significant 6 bits out of a set of bits (1, 0, 0, 1, 0, 1, 0) of the control register 250a as the request signal DMARQ from the output terminal Req to the signal line 232 under the control of the control unit 260a (in step S21 in FIG. 11). The information in the control register 250a indicates that the reception side (destination) is the second digital data processor 200b, that the transmission source is the first digital data processor 200a and that the transfer mode is the one-to-one mode.

When an access request is given from the digital data processor 200a to the direct memory access control device 103b in the second digital data processor 200b, the second digital data processor 200b determines whether the input/output interface circuit 108b (as shown in FIG. 6) is permitted to be used by the sequencer 105b (in step S22 in FIG. 11). If the input/output interface circuit is permitted to be used, the digital data processor 200b notifies the sequencer 105b (as shown in FIG. 6) that the external interface circuit 108 is occupied by transfer of data in the direct memory access mode, and it sets the first bit of the status register 251b to "1" (in step S23 in FIG. 11). The control register 250 and the status register 251 are provided with the same construction in all the digital data processors 200a to 200c (as shown in FIG. 5) of the multiprocessor system. Accordingly, when the second digital data processor 200b sets the first bit of its status register 251b to "1" and transmits the access request, the corresponding bits of the status registers 251a and 251c in the other digital data processors 200a and 200c are also set to "1". Consequently, by observing the contents of the control register and the status register, it becomes possible for all the digital data processors to constantly observe the actual state as to use of the local data bus 221.

Then, real data transfer operation is started. First, the first digital data processor 200a sets the content of the control register 250a to (1 0 0 1 0 1 0) and declares that a bus master of the local data bus 221 is the first digital data processor 200a, that the destination of transfer of data is the second digital data processor 200b and that transfer of data is to be effected with the one-to-one mode. When the second digital data processor 200b finds that it is designated by referring to the content of the control register 250b, it asks the sequencer 105b for permission to occupy the external input/output interface circuit 108b. If the permission for occupation is given by the sequencer 105b, the second digital data processor 200b sets its status register 251b to (0 0 0 0 1 0). Thus, the second digital data processor 200b declares that it accepts transfer of data (in step S24 in FIG. 11).

On the other hand, the first digital data processor 200b as the data transmission source already starts the direct memory access mode according to the instruction from the sequencer 105a and its input/output interface circuit 108a is permitted to be used in the direct memory access mode by the bus controller 109a. In the first digital data processor 200a, a transfer word counter 261a starts operation according to the given program under the control of the control unit 260a, so that the number of words to be transferred is set. At the same time, an internal memory address generator 262a formed by a counter for example starts operation, so that an internal address from the internal memory address generator 262a is applied to the internal memory 100a. Meanwhile, a memory control signal for controlling operation of the internal data memory 100a is applied from the control unit 260a and the data from the internal data memory 100a is transmitted onto the signal line 171a through the internal DMA data bus 153a and the input/output interface circuit 108a. At this time, the bus controller 109a selects the input/output interface circuit 108a for direct memory access operation under the control of the direct memory access control device 103a and the sequencer 105a and connects the internal DMA data bus 153 to the data bus 171 (refer to FIGS. 5 and 7). At the same time, the bus controller 109a transmits the bus selection signal BUSAR through the signal line 173, controls the bus arbiter 210a and connects the data bus 171a to the local data bus 221. The digital transmitting operation from the first digital data processor 200a to the local data bus 221 is carried out under the control of the control unit 260a after detection of rise of the first bit of the data transfer acceptance signal DMACK from the second digital data processor 200b. After the data is transmitted onto the local data bus 221, the first digital data processor 200a sets the third bit of its status register 251a to "1" so as to notify the output of the data. The second digital data processor 200b sets accordingly the third bit contained in the status register 251b to "1". When the setting of the third bit of the status register 251b to "1" is detected, the second digital data processor 200b accepts data on the local data bus 221 selected by the bus arbiter 210b through the input/output interface circuit 108 and writes the data into its internal data memory 100b through the internal DMA data bus 153b. At this time, in the second digital data processor 200b, the internal data memory 100b is in the write operation state under the control of the direct memory access control device 103b and an internal address designating a location of data writing is supplied to the internal data memory 100b through the internal DMA address bus 152a. When the data on the local data bus 221 is written in the internal data memory 100b, the second digital data processor 200b sets the fourth bit of its status register 251b to "1" so as to indicate completion for writing of the data. As a result, the completion of writing of the data in the second digital data processor 200b is selected by the first digital data processor 200a (the step S24 in FIG. 11). The first digital data processor 200a, after having set the third bit of the data of its status register 251a transmitted on the local data bus 221 to "1", waits until the fourth bit of the status register 251a is set to "1" (the step S25 in FIG. 11). When the fourth bit of the status register 251b becomes "1", the busy flag of the status register 251a, namely, the value of the third bit is reset to "0". The state of the status register 251a in the first digital data processor 200a is also detected in the status register 251b in the second digital data processor 200b and the second digital data processor 200b waits for the fall of the third bit of the status register 251b in the direct memory access control device 103b to "0" and, then, the fourth bit is reset to "0". Thus, completion of the first transfer of the data is detected in the first and second data registers 200a and 200b. In the direct memory access control device 103a of the digital data processor 200a, the above described operation is repeated by the number of times corresponding to the number of words set in the transfer word counter 261a (in steps S26 and S27 in FIG. 11). When transfer of data is effected corresponding to the number of words set in the transfer word counter 261a as the transmission source (in step S28 in FIG. 11), the first and second digital data processors 200a and 200b initialize their control registers 250a and 250b and status registers 251a and 251b, so that they are prepared for the next transfer of data (in step S29 in FIG. 11).

In the foregoing description of the operation, transfer of data in direct memory access operation is effected from the input/output interface circuit 108 to the internal data memory 100 through the DMA data bus 153 dedicated to direct memory access (refer to FIG. 6). In this structure, two internal data buses and two internal address buses are provided. However, this construction can be realized easily as far as the internal data memory 100 has dual ports. In the case of such dual port construction, data can be processed by accessing the internal data memory 100 according to a predetermined program in the same digital data processor in parallel with transfer of data in the direct memory access mode. In addition, a multiplexer for switching internal data buses 153 and 155 according to operation modes may be provided and, similarly, the internal address buses 152a, 152b and 154 for transmission of addresses may be formed by using a common data bus.

Let us assume a case in which it becomes necessary for the third digital data processor 200c to access the external data memory 201 in parallel with the data transfer operation between the first and second data processors 200a and 200b. In this case, the control register 200c and the status register 251c in the third digital data processor 200c determine based on the monitoring of the contents of the registers 250a and 250c by the control unit 260c that only the local data bus 221 is occupied and that the main data bus 220 is not used. Accordingly, the second digital data processor 200c can access the external data memory 201 through the main data bus 220 under the control of the direct memory access control device 103c.

In addition, when data is transferred in the direct memory access mode between the first and second digital data processors 200a and 200b, addresses for the respective internal memories 100a and 100b are generated by the internal memory address generators 262a and 262b included in the respective direct memory access control devices 103a and 103b. Accordingly, since the address bus 220 is not used in transfer of data between the two digital data processors, the third digital data processor 200c can access the external data memory 201 through the address bus 222 and the main data bus 220.

Next, description is made of operation in the case of transferring the content of the internal memory 100a of the first digital data processor 200a to the internal memories 100b and 100c of the second and third digital data processors 200b and 200c, respectively.

First, when the first digital data processor 200a receives a signal instructing communication of data in one-to-multiple processors from the sequencer 105a, the first digital data processor 200a sets the content of the control register 250a to (0001110) under the control of the control unit 260a. Thus, it notifies that transfer of data is the broadcast transfer, that the source requesting use of the local data bus 221 is the first digital data processor 200a, and that the second and third digital data processors 200b and 200c are designated as destinations of reception. The procedures of transfer of data are in principle the same as in the case of the above described one-to-one transfer of data. Accordingly, in the case of the broadcast transfer mode, the first digital data processor 200a generally determines the state of the second and third digital data processors 200b and 200c to transmit data. More specifically, if the second and third digital data processors both transmit the data transfer acceptance signal, and if the busy flags indicating that the digital data processors 200b and 200c have written digital data thereinto are both set to "1", the data processor 200a as the source of transmission outputs subsequent data. In this case, in the respective digital data processors, the bus arbiters 210a to 210c select the local data bus 221 under the control of the bus controllers 109a to 109c, respectively, and connect the local data bus 221 to the respective input/output interface circuits 108. If the transfer of data by the direct memory access of the digital data processor 200c shown in FIG. 5 for example is interrupted for any cause, the busy flag of the third digital data processor 200c (i.e., the fifth bit in the status register 251) is not set to "1". The first digital data processor 200a as the data transmission source determines based on the state of this status register that acceptance of data by the third digital data processor 200c is not completed, and stops subsequent transmission of data. After it is confirmed that the busy flag of the third digital data processor 200c (i.e., the fifth bit of the status register 251) is set to "1", the first digital data processor 200a effects subsequent transmission of data. In the meantime, the second digital data processor 200b also monitors the busy flag (the fifth bit of the status register 251) of the third digital data processor 200c and it writes the data on the local data bus 221 into the internal memory 100b and sets the busy flag (i.e., the fourth bit of the status register 251) to "1" indicating the busy state, so that it is in standby state to wait for subsequent transfer of data. In this case, the first digital data processor 200a on the transmission side can detect the transfer mode, which is the one-to-one mode or the broadcast transfer mode, by monitoring of the sixth bit value of its control register 250 by the control unit 260a. On the other hand, the direct memory access control device 103 on the reception side monitors the values of the 0th to second bits of the status register 251 and the control register 250 and determines whether the data transfer mode is the one-to-one mode or the one-to-multiple broadcast transfer mode. Since the broadcast transfer mode can be selected, it is possible to transmit data simultaneously from one digital data processor to the other digital data processors.

In the above described embodiment, when the direct memory access operation is selected, the addresses for the internal data memories of the respective digital data processors are generated by the direct memory access control devices in the respective digital data processors. However, in place of this construction, another construction may be used, as shown in FIG. 12, in which an address bus (local address bus) 323 dedicated to transfer between the digital data processors is connected with all the digital data processors and is used only for transfer of data in direct memory access. In this construction, an address is generated from the external memory address generator 263 included in the direct memory access control device in the digital data processor used as a bus master (that is, a data transmission source) and the external memory address generated in this transmission source is used as an address for designating a destination of writing in the internal data memory in each digital data processor. That is, an external address generated by a bus master is commonly used as an internal address for designating a memory location for data to be written into for each associated digital data processor of destination. Thus, in this construction, if data is to be written in each digital data processor, it is not needed to control programming of an initial value of a counter of an address generator for designating an address in each internal data memory and information can be easily written into desired positions in all the internal data memories. Thus, formation of the program can be simplified.

Further, in the above described embodiment, each digital data processor contains a control register and a status register for monitoring the state in transfer of data in the direct access mode. However, in place of the above described construction, the control register and the status register may be provided outside its digital data processor and in such a case the same effects as described above can be obtained. In this case, not only the control register and the status register, but also other circuit elements such as the control unit 260 necessary for transfer of data in one-to-one and one-to-multiple digital data processors may be provided outside the corresponding digital data processor and only a device for controlling the direct memory access between the external data memory and the internal data memory may be contained in its digital data processor. In this case, even if the number of digital data processors of the multiprocessor system is increased, each digital data processor needs only to transmit the direct memory access request signal and the acceptance signal concerning itself and monitoring and control of the other digital data processors are effected by the control device provided outside. Consequently, the multiprocessor system can be formed easily without increasing the number of input/output pins of the respective digital data processors.

Figure 1:
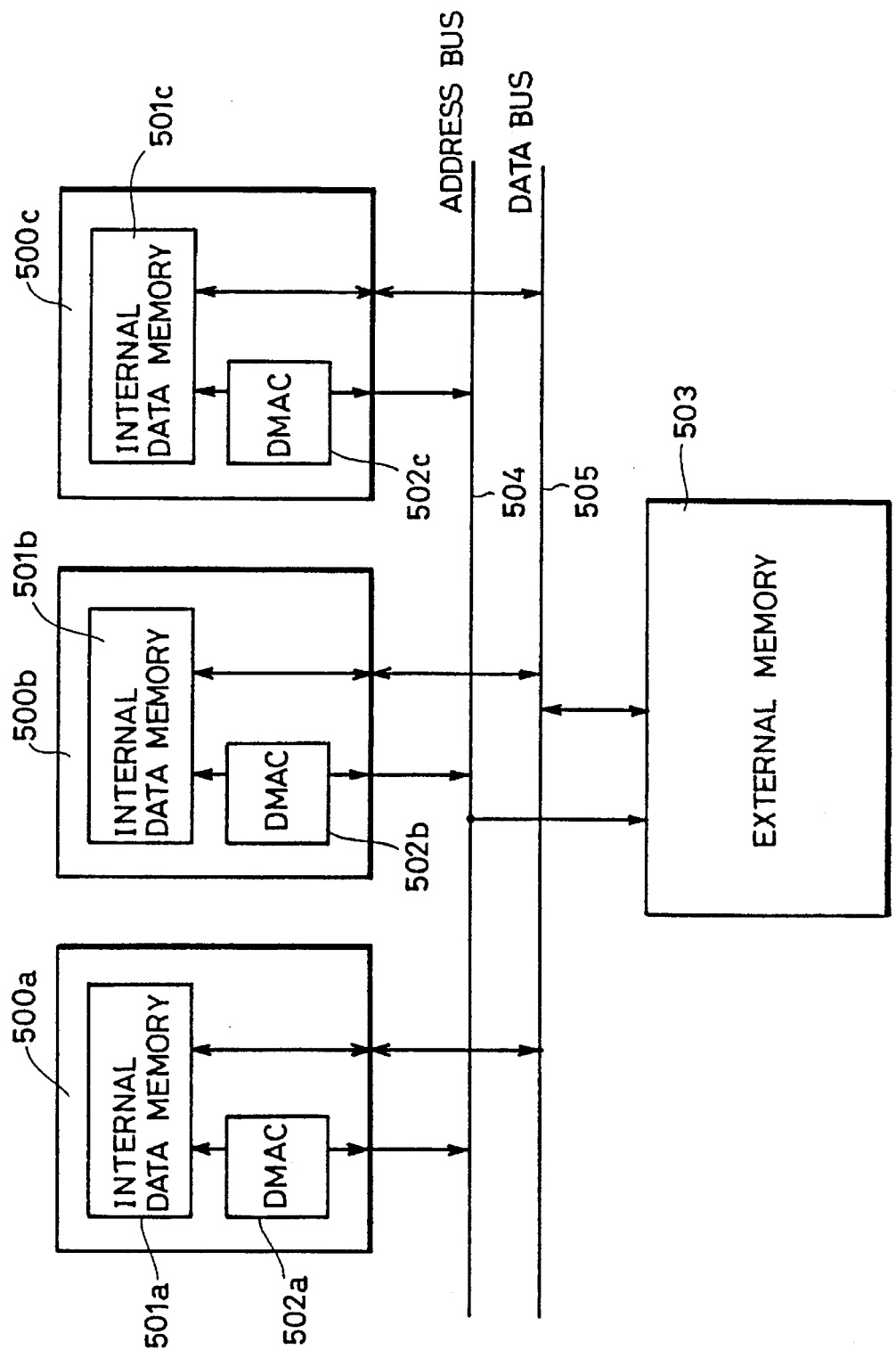
FIG. 1 is a diagram schematically showing a construction of a conventional multiprocessor system.
Figure 2:
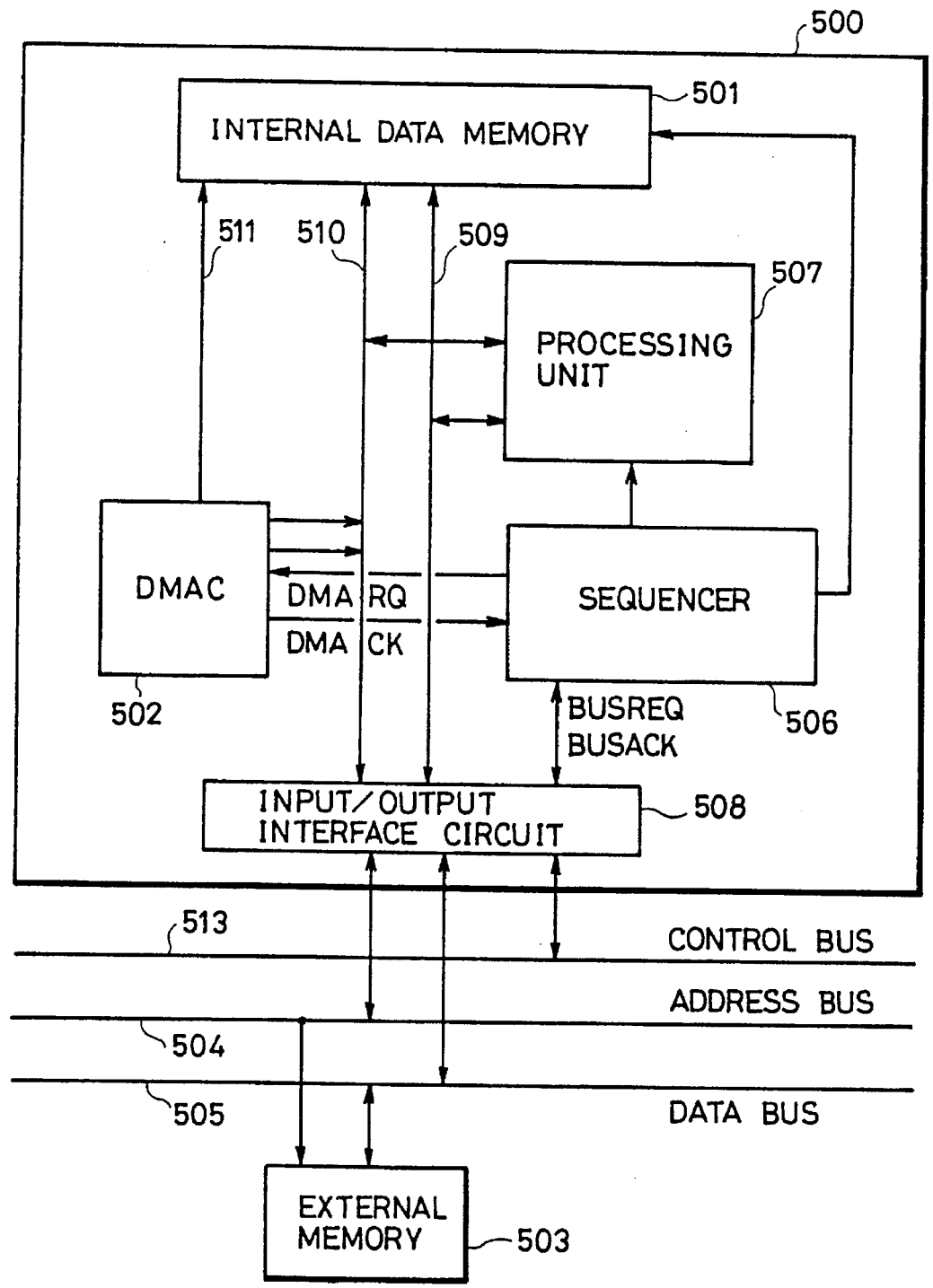
FIG. 2 is a schematic diagram showing a construction of a conventional digital data processor having a data transfer function in a conventional direct memory access mode.
Figure 3:
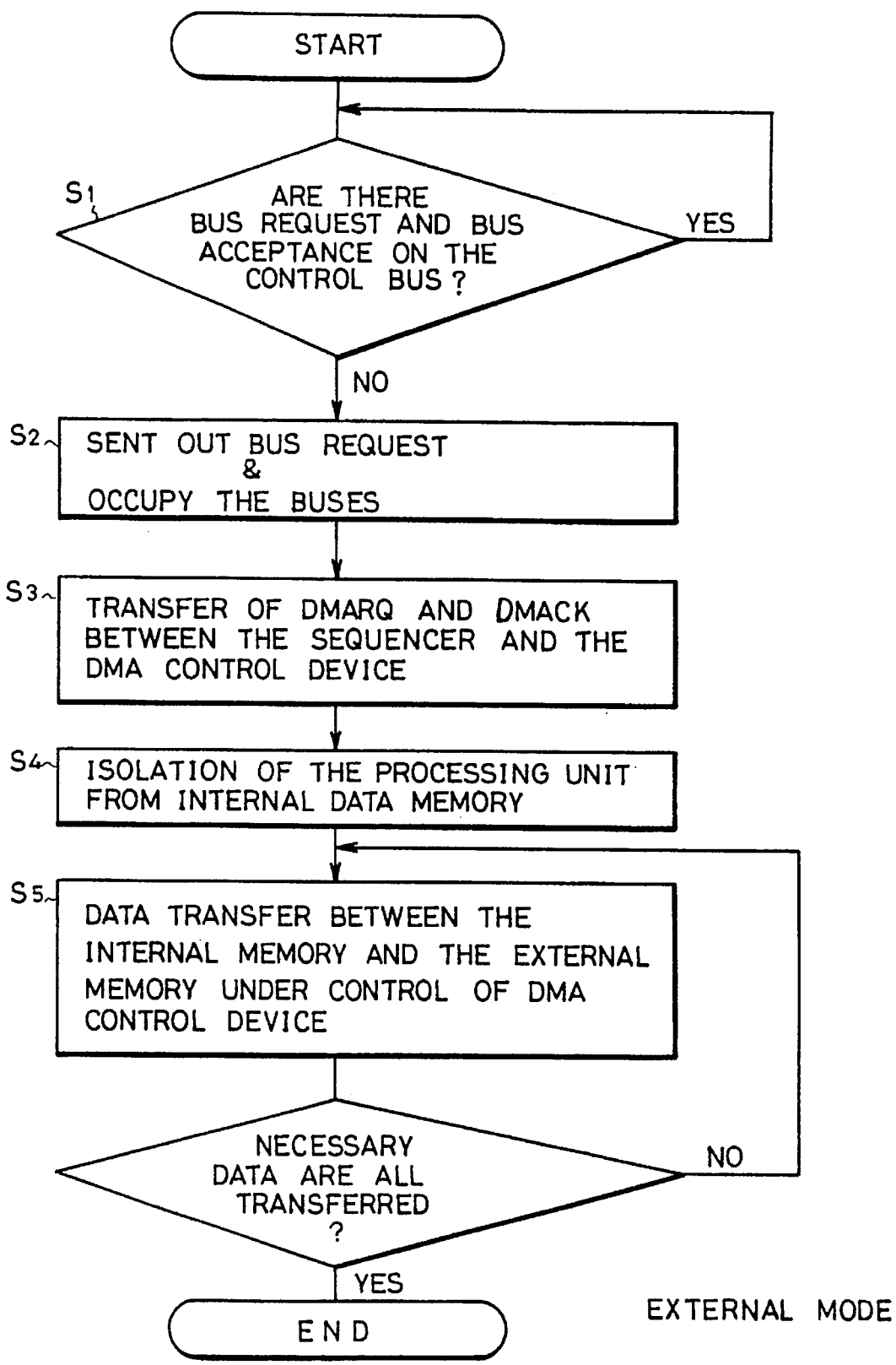
FIG. 3 is a flow chart showing a data transfer operation in a conventional local mode.
Figure 4:
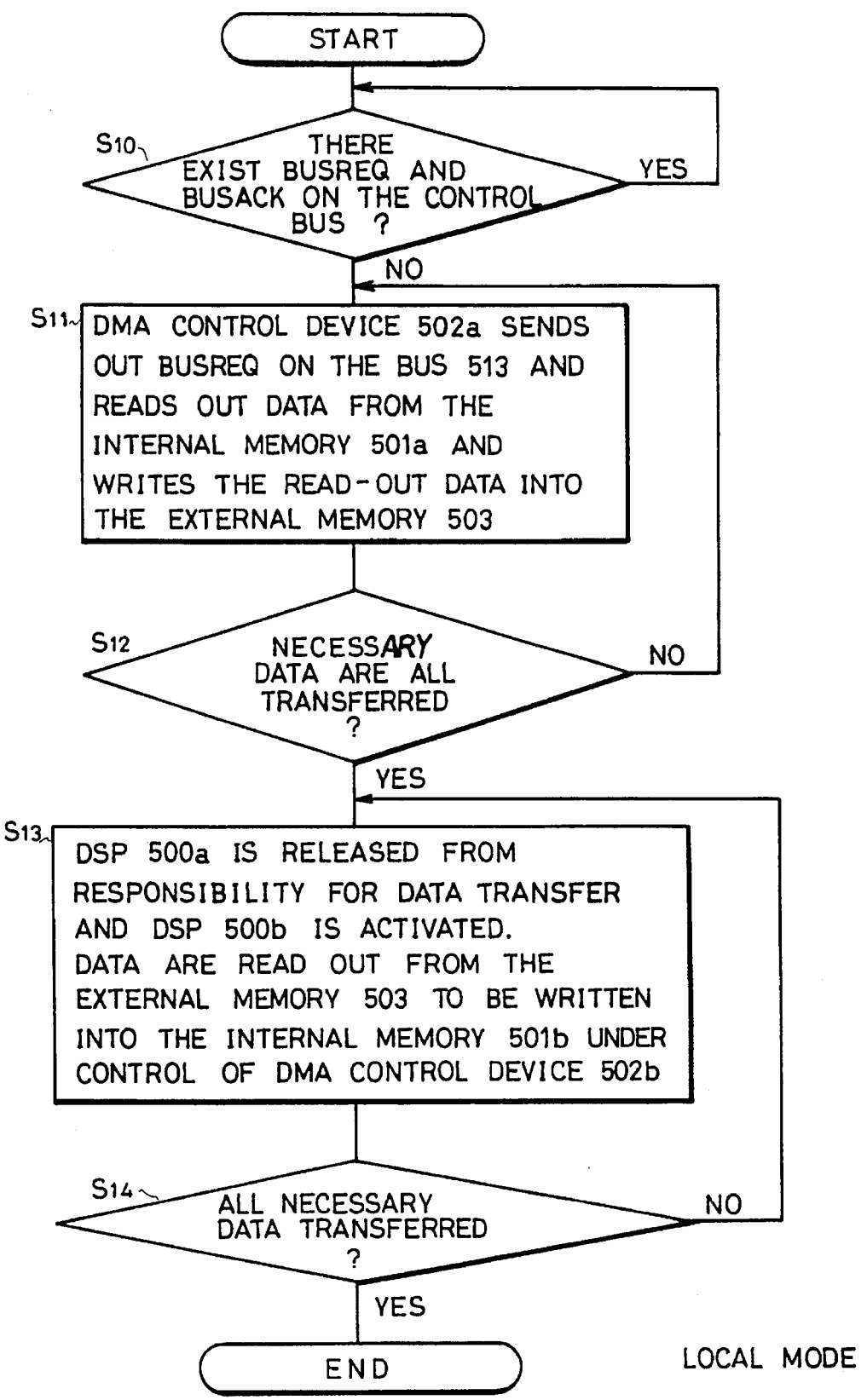
FIG. 4 is a flow chart showing a data transfer operation in a conventional external mode.

In the above described embodiment, one data input/output port is provided for the digital data processors and operation according to the given programs and transfer of data between the plural processors are carried out through the same input/output port. However, in place of this construction, an input/output port for digital data transfer between the plurality of processors and another input/output port for data transfer between the internal data memory and the external data memory may be provided separately, as shown in FIG. 13. More specifically, in the construction shown in FIG. 13, an input/output interface circuit 400 includes a first input/output port 401 for input/output of data between the plurality of processors, a second input/output port for transfer of data to and from the external memory 201 through a common bus (a main data bus) 420, and a port selection circuit 403 for selecting either of the input/output ports 401 and 402 according to the transfer mode. The port selection circuit 403 includes a multiplexer 404 for connecting the internal DMA bus 410 to either the input/output port 401 or the input/output port 402 in response to a control signal $\phi 1$, and a multiplexer 405 for connecting either a program bus 411 (corresponding to the internal buses 154 and 155 shown in FIG. 1) or the internal DMA bus 410 to the input/output port 402. In this case, the internal DMA bus 410 and the program bus 411 may both include a data bus and an address bus or may include only a data bus. Similarly, the local DMA bus 421 and the common bus 420 may both include a data bus and an address bus or may include only a data bus. Accordingly, the input/output ports 401 and 402 may both include the data input/output port and the address input/output port or may include only the data input/output port.

In the above described construction, the multiplexer 404 connects the internal DMA bus 410 to the input/output port 401 under the control of the control signal $\phi 1$ at the time of transferring data in the direct memory access mode between the plurality of processors. In this case, the second multiplexer 405 connects the program bus 411 to the input/output port 402 in response to a control signal $\phi 2$. In the case of transferring data in the direct memory access mode between the internal data memory 100 and the external common memory 201, the internal DMA bus 410 is connected to the input/output port 402 under the control of the control signals $\phi 1$ and $\phi 2$. Those control signals $\phi 1$ and $\phi 2$ are generated according to the data transfer modes. For example, they are generated from the bus controller 109 in response to an operation transfer designation mode from the sequencer 105 and the direct memory access control device 103. Accordingly, in the above described construction, if the internal data memory 100 is accessed through the first input/output port 401, data can be transferred between the internal data memory and the external data memory through the program bus 411 by means of the second input/output port 402 since the common bus 420 is not used. This transfer of data through the program bus 411 is effected under the control of the sequencer. In addition, in the case of transferring data in the direct memory access mode between the internal data memory and the the external data memory, the internal DMA bus 410 is connected to the input/output port 402 by the functions of the multiplexers 404 and 405. Thus, without deteriorating the data transfer function between the internal data memory and the external data memory in the direct memory access mode, transfer of data between the processors can be effected in the direct memory access mode and in parallel therewith transfer of data between the internal data memory and the external data memory can be effected through the program bus 411. Accordingly, it becomes possible to transfer and process data at a higher speed and thus the thruput of the system can be improved.

In the above described embodiments, it is simply described that the bus arbiters select the data communication path in response to the signal BUSAR issued from the associated DSPs. The specific configuration and operation thereof will be described with reference to FIGS. 14A and 14B.

In FIG. 14A, a specific structure of the bus arbiter for DSP 400a is representatively shown. Referring to FIG. 14A, the bus arbiter 410a includes a connection path for the local bus 221 and a connection path for the main bus 220.

The connection path for the local path includes transmission gates TM1 and TM2 and AND gates AN1 and AN2. The transmission gate TM1 receives data from DSP 400a to send the same onto the local bus 221. The transmission gate TM2 receives data on the local bus 221 to transfer the same to DSP 400a. AND gate AN1 receives a write/$\overline{\text{read}}$ enable signal WE/$\overline{\text{RE}}$ from DSP 400a and a local bus occupation acknowledge signal LBUSAK1 and a signal LBUSUSE indicating that the local bus 221 is in utilization. AND gate AN1 controls the ON/OFF of the transmission gate TM1. AND gate AN1 provides an output of "H" to enable the transmission gate TM1 when the signals WE/$\overline{\text{RE}}$, LBUSUSE and LBUSAK1 are all "H".

AND gate AN2 receives the signal LBUSUSE at the truth input, the signal LBUSAK1 at the false input and the signal WE/$\overline{\text{RE}}$ at another false input. AND gate AN2 provides an output of "H" to enable the transmission gate TM2 when the signal LBUSUSE is "H" and the signals WE/$\overline{\text{RE}}$ and LBUSAK1 are both "L".

The connection path for the main bus includes transmission gate TM3 and TM4 and AND gates AN3 and AN4. The transmission gate TM3 transfers data from the main bus 220 to DSP400a while the transmission gate TM4 transfers data from DSP400a to the main bus 220. 3-input AND gate AN3 receives at respective false inputs the signal WE/$\overline{\text{RE}}$, the signal LBUSUSE and at the truth input a signal MBUSAK1 indicating that the main bus 220 is released for DSP400a. AND gate AN3 provides an output of "H" when the signals WE/$\overline{\text{RE}}$, LBUSUSE are "L" and a signal MBUSAK1 is "H", to enable the transmission gate TM3.

Three input AND gate AN4 receives at respective inputs the signal WE/$\overline{\text{RE}}$, the signal MBUSAK1 and a signal MBUSUSE indicating that the main bus 220 is in occupation for data transference. AND gate AN4 provides an output of "H" to enable the transmission gate TM4, when the signals WE/$\overline{\text{RE}}$, MBUSAK1 and MBUSUSE are all "H".

The bus arbiter 410b . . . has the same configuration as the arbiter 410a excluding that it receives signals MBUSAJ2 and LBUSAK2 in place of the signals MBUSAK1 and LBUSAK1.

Figure 14B:
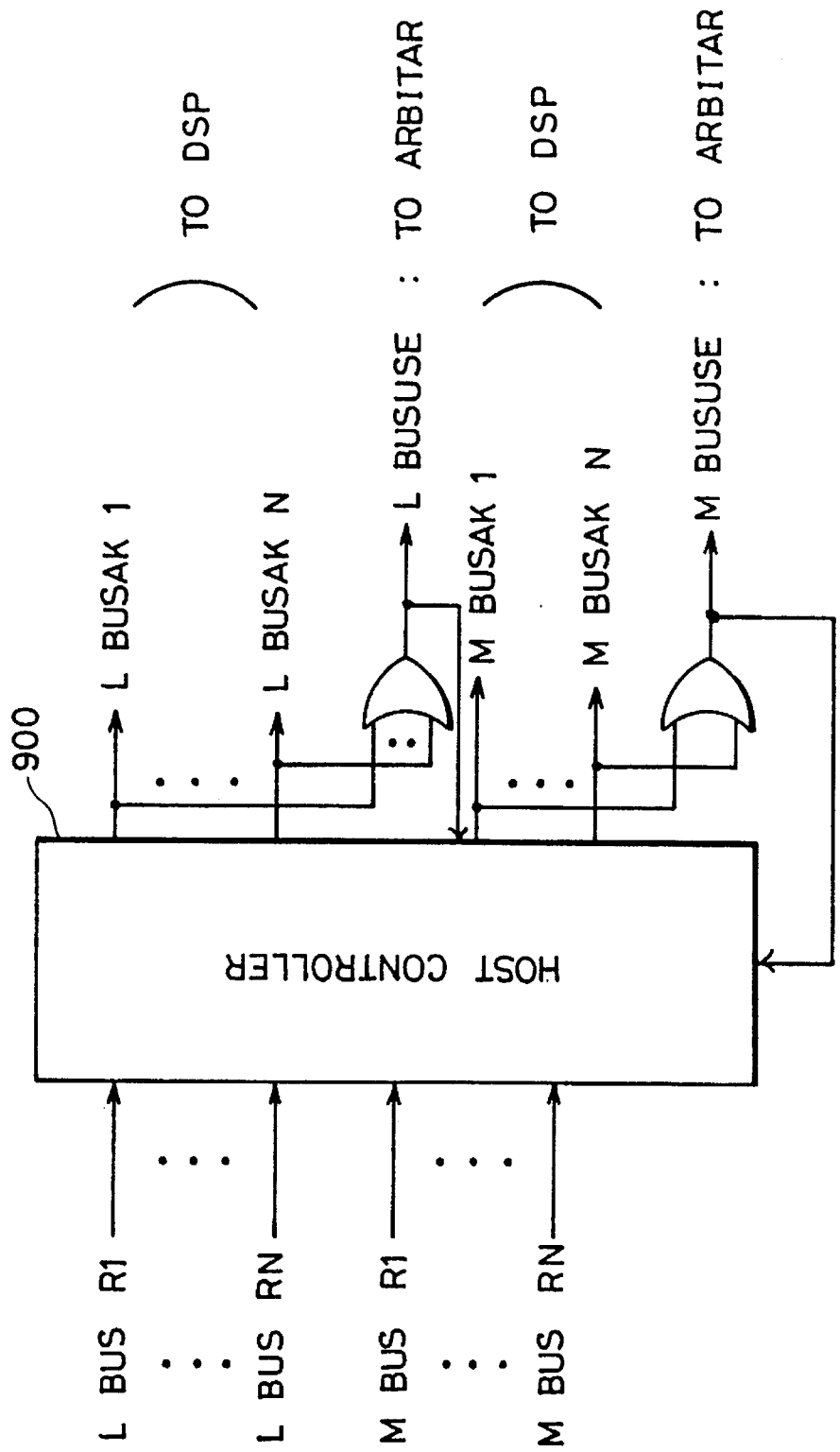
FIG. 14B shows a controller for controlling the bus arbitration.

In order to generate the signals LBUSAK, MBUSAK, LBUSUSE and MBUSUSE, a host controller 900 is provided, as shown in FIG. 14B. The controller 900 monitors the occupation state of the local bus 221 and the main bus 220. The controller 900 receives the signals LBUSR1 to LBUSRn (n: the number of DSPs) requesting the local bus occupation from the respective DSPs 400a, 400b, . . . in parallel through separate signal lines or the signal line (bus) 232. If the local bus 221 is not occupied when a local bus request signal is issued, the controller 900 sends through the bus 231 or a separate bus an active local bus use acknowledge signal LBUSAK back to the DSP which requests the occupation of the local bus 221, and also provides an active local bus use signal LBUSUSE to every bus arbiter. If the local bus 221 is already in occupation by a DSP when a local bus request is issued by another DSP, the controller 900 does not acknowledge the local bus request and sends an inactive signal LBUSAK to the another DSP until the local bus 221 is released. In this case, the signal LBUSUSE is at "H".

The controller 900 also monitors the occupation state of the main bus 220. The controller 900 receives the main bus occupation request signals MBUSR from the DSPs in parallel through a separate signal bus (not shown) to issue main bus occupation acknowledge signal MBUSAK to respective DSPs through signal lines (not explicitly shown), and also provides the main bus use signal MBUSUSE to respective bus arbiters 410a, 410b, . . . . Now, operation of bus arbitration will be described.

When DSP 400a desired to transfer data to and from the external memory (refer to FIGS. 1 and 12), DSP 400a generates the signal MBUSR1 to provide the same to the controller 900. If the main bus 220 is not occupied, the controller 900 sends the active acknowledge signal MBUSAK1 to DSP 400a. DSP 400a then send the signal MBUSAK1 and the signal WE/$\overline{\text{RE}}$ to the associate bus arbiter 410a. The controller 900 also sends out an active signal MBUSUSE to the bus arbiters 410a, 410b, . . . . When the signal WE/$\overline{\text{RE}}$ is "H", the AND gate AN4 is enabled to make conductive the transmission gate TM4. Thus, data are transferred from DSP400a through the main bus 220 to the externally common memory. Meanwhile, when the local bus 221 is not occupied (that is, the signal LBUSUSE is "L") and the signal WE/$\overline{\text{RE}}$ is "L", the transmission gate TM3 is opened so that data are transferred from the externally memory to DSP400a through the main bus 220.

In the data transfer through the local bus 221, DSP400a issues the local bus request signal LBUSR1 to provide the same to the controller 900. When the local bus 221 is not occupied, the controller 900 issues the acknowledge signal LBUSAK1 to provide the same to the DSP400a and also provides the activated signal LBUSUSE to all the bus arbiters 410a, 410b . . . . DSP1 accordingly generates the signal WE/$\overline{\text{RE}}$ of "H" to transfer data onto the local bus 221 through the transmission gate TM1. Other DSPs which are designated as a destination send out the signal WE/$\overline{\text{RE}}$ of "L" to read into the data on the local bus 221 through the transmission gate TM2.

Under such condition, any DSP can transfer desired data from itself to the external memory through the main bus 220, if the interface circuit has a dual port configuration.

In the above configuration, a DSP which does not partake in the direct data transfer through the local bus 221 can not read into data from the external memory through the main bus 220. By such configuration, data confliction between data from the local bus 221 and one from the main bus 220 is avoided. It should be noted that the configuration of the arbiter shown in FIG. 14A is mere one example, and that any other configuration may be employed.

As described in the foregoing, according to the present invention, the common bus connecting the respective digital data processors and the external data memory, and the local bus dedicated to transfer of data between the plurality of digital processors are provided and at the same time a control register for setting the transfer mode and a status register for confirmation of the status of the related data processor are provided corresponding to each digital data processor, so that data is transferred according to the content of the control register and the status register. Consequently, transfer of data can be effected at high speed in the direct memory access mode between the plurality of digital data processors without using a low-speed external data memory and the thruput of the system is improved. Further, since transfer of data between the processors is effected through the local bus dedicated to transfer of data between the processors, the digital data processors not related with the actual transfer of data among the processors can access the external data memory in parallel with the transfer of data, which makes it possible to improve the data processing capability in the multiprocessor system.

In addition, since transfer of data is effected according to the result of monitoring of the contents of the control register and the status register indicating the status of its digital data processor, data can be transferred in the direct memory access mode in one-to-multiple transfer modes and thus a multiprocessor system having a high thruput can be obtained.

Furthermore, if an input/output port connecting the local bus and an input/output port for accessing the external memory are provided separately in each digital data processor, it becomes possible to access the external memory in the same digital data processor in parallel with transfer of data between the processors. Thus, data processing can be effected at a higher speed and a multiprocessor system having a higher thruput can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multiprocessor system including a plurality of digital data processors, each having an internal memory, and an external memory commonly coupled through a first bus with said plurality of digital data processors, said first bus including a data bus for transferring data and an address bus for transferring an address signal, comprising:

a plurality of direct memory access control units each provided to a corresponding one of said plurality of digital data processors;

a control bus different from said first bus and commonly connecting said plurality of direct memory access units, and a second bus separate from said first bus and said control bus and commonly connecting said plurality of digital data processors, for data transfer in a direct memory access mode between any two or more of said plurality of digital data processors, said second bus including a data bus for transferring data and another address bus for transferring an address signal;

each direct memory access control unit including:
(a) first means for transmitting and receiving a first memory access request signal on said control bus,
(b) second means for transmitting and receiving a direct memory access request acknowledgment signal on said control bus,
(c) third means responsive to a direct memory access request acknowledgment signal received by said second means, for accessing the internal memory in the associated digital data processor, for data transfer between said internal memory and said second bus, and
(d) fourth means responsive to transmission of a direct memory access acknowledgment signal from said second means onto said control bus, for accessing the internal memory for data transfer between said internal memory and said second bus, wherein data transfers between the internal memory and said second bus are performed externally of said external memory, and said second bus couples none of said plurality of digital data processors to said external memory.

2. A system according to claim 1, wherein said third means includes means for writing data on said second bus into said internal memory, and said fourth means includes means for reading data of the internal memory onto said second bus.

3. A system according to claim 1, wherein said third means includes means for reading data of the internal memory onto said second bus, and said fourth means includes means for writing data on said second bus into said internal memory.

4. A system according to claim 1, wherein said first means includes means for generating data designating a destination of transfer of data, said second means includes means for transferring data specifying an associated digital data processor when transmitting the direct memory access acknowledgment signal, and means for receiving and storing data specifying a source of the direct memory access acknowledgment signal, and said third means includes detecting means for detecting a coincidence between the data specifying the destination of transfer of data and the data specifying the source of the received direct memory access acknowledgment signal, and means responsive to the detection of a coincidence by said detecting means, for accessing the internal memory of the associated digital data processor.

5. A system according to claim 1, wherein each direct memory access control unit is operable in a first transfer mode for effecting data transfer through said second bus between two of the digital data processors selected from said plurality of digital data processors, and a second transfer mode for effecting data transfer between a digital data processor and the remaining digital data processors, through said second bus.

6. A system according to claim 1, wherein each direct memory access control unit has a first transfer mode for effecting data transfer through said second bus between any two or more of said plurality of digital data processors, and a second transfer mode for effecting data transfer in the direct memory access mode between the internal memory in the associated digital data processor and said external memory through said first bus, and said each direct memory access control unit includes
  generating means for generating a designation signal designating a data transfer mode, and
  port selection means responsive to said designation signal, for selectively connecting the associated internal memory to either said first bus or said second bus.

7. A system according to claim 1, wherein each direct memory access control unit further includes means for generating a first bus request signal requesting occupation of the first bus for accessing said external memory and a second bus request signal for requesting occupation of the second bus for data transfer between the associated digital data processor and another digital data processor, and said system further includes
  control means for monitoring the first and second bus requesting signals from each of said direct memory access control units and generating a bus usage acknowledge signal for each said digital data processor,
  said bus usage acknowledge signal including a first signal for admitting the usage of the first bus, and a second signal for admitting the usage of the second bus, and
  arbitration means provided for each said digital data processor and responsive to said bus usage acknowledge signal, for selectively coupling the associated internal memory either to said first bus or to said second bus.

8. A system according to claim 1, wherein each direct memory access control unit further includes first multiple bit register means containing bits defining a data transfer operating mode of the respective digital data processor and second multiple bit register means containing bits defining an operating status of the respective digital data processor.

9. A system according to claim 8, wherein said first multiple bit register means contains destination indicating bits and source indicating bits for the respective digital data processors, and a broadcasting mode indicating bit indicating data transfer between a digital data processor and a plurality of digital data processors.

10. A system according to claim 1, wherein each digital data processor includes
  a first input/output port used as an interface for inputting and outputting information with said first bus, and
  a second input/output port provided separately from said first input/output port and used as an interface for inputting and outputting information with said second bus, and
  said direct memory access control unit includes
    means for generating a transfer mode indicating signal instructing whether data transfer is effected between the associated internal memory and the external common memory or between the associated internal memory and the internal memory of another digital data processor in a direct memory access mode, and
    selection means responsive to said transfer mode indicating signal, for selectively coupling the associated internal memory to said first input/output port or to said second input/output port.

11. A system according to claim 10, wherein said first bus includes an address bus for transmitting an addressing signal for designating an address of the external memory and a data bus for transmitting data, and
  said second bus includes an address bus for transmitting an address for designating an address of an internal memory of a digital data processor being the destination of data transfer, and a data bus for transmitting data, and
  said information includes an address signal and data.

12. A system according to claim 10, wherein each digital data processor includes
  a data processing unit for accessing an associated internal memory for performing a processing operation according to a given program,
  a first internal bus coupled to said associated internal memory and said data processing unit for transmitting data in an operation mode other than said direct memory access mode, and
  a second internal bus coupled to said associated internal memory for transmitting data in said direct memory access mode, and
  said selection means includes
    a first selector means for connecting said second internal bus to said first input/output port when said transfer mode indicating signal instructs data transfer to said external memory, and
    a second selector means for connecting said second internal bus to said second input/output port when said transfer mode indicating signal instructs data transfer to another digital data processor, and
  said first selector means includes means responsive to said transfer mode indicating signal not being generated, for connecting said first internal bus to said first input/output port.

13. A system according to claim 1, wherein each said direct memory access control unit is incorporated in a corresponding digital data processor.

14. The multiprocessor system according to claim 1, wherein said first bus and said second bus transfer a same common type of data with each other.

15. The multiprocessor system according to claim 1, wherein the data bus of said first bus and the data bus of the second bus have a common arrangement.

16. A multiprocessor system having a plurality of digital data processors each containing a direct memory access control device and an internal memory, and an external memory commonly connected to said plurality of digital data processors through a first bus, comprising:
  a second bus separate from said first bus and having said plurality of digital data processor connected in parallel thereto, for data transfer between a digital data processor and one or more other digital data processors, said first bus including a data bus for transferring data and an address bus and said second bus including a data bus for transferring data and another address bus,
  said direct memory access control device including;
    first means for transmitting and receiving a direct memory access request signal for requesting data transfer in a direct memory access mode, said direct memory access request signal including information for specifying a source and a plurality of destinations for the data transfer,
    second means for transmitting and receiving a direct memory access acknowledge signal acknowledging data transfer request, said direct memory access acknowledge signal including information specifying a destination of the data transfer,
    third means for accessing a corresponding internal memory and transmitting the content of the corresponding internal memory onto said second bus, in response to reception of the direct memory access acknowledge signal from all the destinations after transmission of the direct memory access request signal from said first means, and fourth means for accessing the corresponding internal memory and writing data on said second bus into the corresponding internal memory, in response to the transmission of the direct memory access acknowledge signal by said second means, said third and fourth means accessing the content of and writing data to, said internal memory externally of said external memory, wherein said second bus couples none of said plurality of digital data processors to said external memory.

17. The multiprocessor system according to claim 16, wherein said first bus and said second bus transfer a same common type of data with each other.

18. The multiprocessor system according to claim 16, wherein the data bus of said first bus and the data bus of the second bus have a common arrangement.

19. A multiprocessor system having a plurality of digital data processors each containing an internal memory, and an external memory commonly coupled to said plurality of digital data processors through a first bus, comprising:

a second bus separate from said first bus, and commonly coupled to said plurality of digital data processors, for data transfer between any of the digital data processors, said first bus including a data bus for transferring data and an address bus for transferring an address signal and said second bus including a data bus for transferring data and another address bus for transferring an address signal, each digital data processor including:
(a) first means for transmitting and receiving a direct memory access request signal for requesting data transfer in a direct memory access mode, said request signal including information specifying a source and a destination of the data transfer access,
(b) second means for transmitting and receiving a direct memory access acknowledge signal acknowledging a data transfer request in the direct memory access mode, said acknowledge signal including information specifying a destination of the data transfer access,
(c) third means for accessing an associated internal memory for effecting data transfer in the direct memory access mode between said associated internal memory and said second bus, in response to reception of the direct memory access acknowledge signal by said second means after transmission of said direct memory access request signal from said first means, and
(d) fourth means for accessing the associated internal memory for effecting data transfer between said associated internal memory and said second bus, in response to transmission of said acknowledge signal from said second means after reception of said request signal by said first means, wherein said third and fourth means perform said data transfers between said associated internal memory and said second bus externally of said external memory, and said second bus couples none of said plurality of digital data processors to said external memory.

20. The multiprocessor system according to claim 19, wherein said first bus and said second bus transfer a same common type of data with each other.

21. The multiprocessor system according to claim 19, wherein the data bus of said first bus and the data bus of the second bus have a common arrangement.

22. A direct memory access control device provided for each digital data processor containing an internal memory in a multiprocessor system including a plurality of digital data processors and an external memory commonly coupled with the plurality of said digital data processors through a first bus, comprising:

first means for transmitting and receiving a direct memory access request signal on a control bus different from said first bus;

second means for transmitting and receiving a direct memory access acknowledge signal on said control bus;

third means responsive to a direct memory access acknowledge signal received by said second means, for accessing an internal memory in a corresponding digital data processor, for effecting data transfer in a direct memory access mode between the internal memory and a second bus different from the first bus and the control bus, said first bus including a data bus for transferring data and an address bus for transferring an address signal and said second bus including a data bus for transferring data and another address bus for transferring an address signal, the plurality of the digital data processors connected in parallel to said second bus, for data transfer between any digital data processors in said plurality of digital data processors; and fourth means responsive to transmission of a direct memory access acknowledge signal from said second means onto said control bus, for accessing the corresponding internal memory for data transfer between said corresponding internal memory and said second bus in the direct memory access mode, wherein said third and fourth means perform said data transfers between said corresponding internal memory and said second bus externally of said external memory, and said second bus couples none of said plurality of digital data processors to said external memory.

23. A direct memory access control device according to claim 22, further including:

fifth means for effecting data transfer in the direct memory access mode between the corresponding internal memory and said external memory through said first bus.

24. A device according to claim 22, wherein said first means includes means for generating data designating a destination of data transfer, said second means includes means for transferring data specifying the associated digital data processor when transmitting the direct memory access acknowledgment signal, and means for receiving and storing data specifying a source of the direct memory access acknowledgment signal, and said third means includes detecting means for detecting a coincidence between the data specifying the destination of transfer of data and the data specifying the source of the received direct memory access acknowledgment signal, and means responsive to the detection of a coincidence by said detecting means, for accessing the internal memory of the associated digital data processor.

25. A device according to claim 22, wherein each direct memory access control device is operable in a first transfer mode for effecting data transfer through said second bus between two of the digital data processors selected from said plurality of digital data processors, and a second transfer mode for effecting data transfer between a digital data processor and the remaining digital data processors.

26. A device according to claim 22, wherein each direct memory access control device is operable in a first transfer mode for effecting data transfer through said second bus between any two or more of said plurality of digital data processors, and a second transfer mode for effecting data transfer in the direct memory access mode between the internal memory in the associated digital data processor and said external memory through said first bus, and said each direct memory access control device includes generating means for generating a designation signal designating a data transfer mode, and port selection means responsive to said designation signal, for selectively connecting the associated internal memory to either said first bus or said second bus.

27. A device according to claim 22, further including first multiple bit register means containing bits defining a data transfer operating mode of the respective digital data processor and second multiple bit register means containing bits defining an operating status of the respective digital data processor.

28. A device according to claim 27, wherein first multiple bit register means contains destination indicating bits and source indicating bits for the respective digital data processors, and a broadcasting mode indicating bit indicating data transfer between a digital data processor and a plurality of digital data processors.

29. A device according to claim 22, wherein each digital data processor includes a first input/output port used as an interface for inputting and outputting information with said first bus, and a second input/output port provided separately from said first input/output port and used as an interface for inputting and outputting information with said second bus, and said direct memory access control device includes means for generating a transfer mode indicating signal instructing whether data transfer is effected between the associated internal memory and the external memory or between the associated internal memory and the internal memory of another digital data processor in a direct memory access mode, and selection means responsive to said transfer mode indicating signal, for selectively coupling the associated internal memory to said first input/output port or to said second input/output port.

30. A device according to claim 29, wherein said first bus includes an address bus for transmitting an addressing signal for designating an address of the external memory and a data bus for transmitting data, and said second bus includes an address bus for transmitting an address for designating an address of an internal memory of a digital data processor being the destination of a data transfer request, and a data bus for transmitting data, and said information includes an address signal and data.

31. A device according to claim 29, wherein each digital data processor includes a data processing unit for accessing an associated internal memory for performing a processing operation according to a given program, a first internal bus coupled to said associated internal memory and said data processing unit for transmitting data in an operation mode other than said direct memory access mode, and a second internal bus coupled to said associated internal memory for transmitting data in said direct memory access mode, and said selection means includes a first selector means for connecting said second internal bus to said first input/output port when said transfer mode indicating signal instructs data transfer with said external memory, and a second selector means for connecting said second internal bus to said second input/output port when said transfer mode indicating signal instructs data transfer with another digital data processor, and said first selector means includes means responsive to said transfer mode indicating signal not being generated, for connecting said first internal bus to said first input/output port.

32. A device according to claim 22, wherein said direct memory access control device is incorporated in a corresponding digital data processor.

33. The direct memory access control device according to claim 22, wherein said first bus and said second bus transfer a same common type of data with each other.

34. The direct memory access control device according to claim 22, wherein the data bus of said first bus and the data bus of the second bus have a common arrangement.

35. Data transfer method in a multiprocessor system including a plurality of digital data processors each having an internal memory, and an external common memory which each digital data processor can access for writing and reading data through a first bus, and a second bus through which said each digital data processor can transfer data to and from any other digital data processor, said first bus including a data bus for transferring data and said second bus including a data bus for transferring data and an address bus for transferring an address signal, comprising the steps of:

transmitting a direct memory access request signal while designating a second digital data processor as a destination of the access from a first digital data processor, transmitting a direct memory access acknowledge signal including information specifying the second digital data processor to said first digital data processor from said second digital data processor, in response to said direct memory access request signal received at said second digital data processor, accessing the internal memory in said first digital data processor in response to reception of said direct memory access acknowledge signal by said first digital processor, accessing the internal memory in said second digital data processor in response to transmission of said direct memory access acknowledge signal, and coupling the internal memories in said first and second digital data processors for transferring data between the internal memories in said first and second digital data processors through said second bus and externally said external common memory, said first digital data processor also transferring an address signal through said second bus, externally of said external common memory, to said second digital data processor, wherein the step of coupling includes the step of coupling the internal memories through the second bus having no coupling to said external memory.

36. The data transfer method according to claim 35, wherein said step of coupling includes the step of transferring data of a same type as that of data to be transferred through said first bus, through said second bus.

37. The data transfer method according to claim 35, wherein said step of coupling includes the step of transferring data in a same data arrangement as that of data transferred through said first bus.

38. Data transfer method in a multiprocessor system having a plurality of digital data processors each having an internal memory, and at least one external memory commonly connected to said plurality of digital processors through a first bus, and a second bus commonly connected to said plurality of digital data processors and provided separately from said first bus, said first bus including a data bus for transferring data and said second bus including a data bus for transferring data and an address bus for transferring an address signal, comprising the steps of:

transmitting a direct memory access request signal while designating destinations of transfer of data from a first digital data processor out of said plurality of digital data processors, transmitting a direct memory access acceptance signal including information specifying the respective digital data processors designated in response to said direct memory access request signal and applying said acceptance signal to said first digital data processor, accessing the internal memory in said first digital data processor in response to said memory access acceptance signal and transmitting a content of said internal memory as well as address signals associated with the content onto said second bus, and writing the data transmitted onto said second bus into the corresponding internal data memory in each designated digital data processor according to the address signals on the second bus after said direct memory access acceptance signal has been transmitted from said each designated digital data processor, wherein said steps of transmitting the content of said internal memory onto said second bus and writing the data into the corresponding internal memory are performed externally of said at least one external memory commonly connected to said plurality of digital processors, and said steps of accessing and writing are performed through said second bus having no coupling to said at least one external memory.

39. The data transfer method according to claim 38, wherein said steps of accessing and writing include the steps of accessing and writing data of a same type as that of data to be transferred through said first bus.

40. The data transfer method according to claim 38, wherein said steps of accessing and writing include the steps of accessing and writing data in a same arrangement as that of data to be transferred through said first bus.

41. Data transfer method in a multiprocessor system having a plurality of digital data processors each having an internal memory, and at least one external memory commonly connected to said plurality of digital processors through a first bus, and a second bus being commonly connected to said plurality of digital data processors and being provided separately from said first bus, said first bus including a data bus for transferring data and an address bus for transferring an address signal, said multiprocessor system being operative in a local mode for data transfer among digital data processors and in an external mode for data transfer between one of said digital data processors and said external common memory, said method including the steps of said local mode operation and said external mode operation;

said local mode including the steps of
detecting that said second bus is unoccupied,
designating a source and destination for data transfer,
detecting that the destination is ready for receiving data, and
transferring data and an associated address signal in a direct memory access mode from the source to the destination through said second bus and externally of said at least one external memory;

said external mode including the steps of
detecting that said first bus is unoccupied by any of said digital data processors, and
transferring data and an address signal in the direct memory access mode between the internal memory included in a digital data processor requiring data transfer and said external memory through said first bus, wherein the step of transferring in said local mode includes the step of transferring data through said second bus having no coupling to said at least one external memory.

42. A method according to claim 41, wherein said local mode includes a broadcasting mode for data transfer between a digital data processor of the source and a plurality of digital data processors of the destination through said second bus.

43. The data transfer method according to claim 41, wherein said step of transferring in said local mode includes the step of transferring data of a same type as that of data transferred though said first bus in said external mode.

44. The data transfer method according to claim 41, wherein said step of transferring in the local mode includes the step of transferring data through the second bus having a same arrangement of that of said first bus.

45. A system including a plurality of submembers, at least one main memory, a first bus coupling each submember to said at least one main memory, comprising:

a control bus different from said first bus;

a second bus separate from said first bus and said control bus, and commonly connected to said plurality of submembers, said first bus including a data bus for transferring data and an address bus for transferring an address signal and said second bus including a data bus for transferring data and another address bus for transferring an address signal;

first means for transmitting a direct memory access request signal including data specifying a source and a destination of the accessing among the submembers on the control bus;

second means for receiving the direct memory access request signal generated by said first means on the control bus;

third means responsive to said second means for transmitting on the control bus a direct memory access acknowledge signal including data specifying a submember designated by said request signal as the destination; and fourth means responsive to said first means and said third means for effecting data transfer through said second bus and externally of said at least one main memory between the submember designated as the source and at least one submember designated as the destination, wherein said second bus couples none of said plurality of digital data processors to said external memory.

46. The system according to claim 45, wherein said first bus and said second bus transfer a same common type of data with each other.

47. The system according to claim 45, wherein the data bus of said first bus and the data bus of the second bus have a common arrangement.

* * * * *